(12) United States Patent
Yahata et al.

(10) Patent No.: US 8,717,419 B2
(45) Date of Patent: May 6, 2014

(54) IMAGE PROCESSING APPARATUS AND METHOD

(75) Inventors: Kazuhiro Yahata, Fuchu (JP); Takuya Kotani, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 13/086,261

(22) Filed: Apr. 13, 2011

(65) Prior Publication Data

US 2011/0254927 A1 Oct. 20, 2011

(30) Foreign Application Priority Data

Apr. 16, 2010 (JP) ................................. 2010-095095

(51) Int. Cl.
*H04N 13/02* (2006.01)
*H04N 13/00* (2006.01)
*H04N 13/04* (2006.01)

(52) U.S. Cl.
CPC ....... *H04N 13/0011* (2013.01); *H04N 13/0239* (2013.01); *H04N 13/0055* (2013.01); *H04N 13/0296* (2013.01); *H04N 13/0497* (2013.01); *H04N 13/0242* (2013.01)
USPC ................... 348/46; 348/47; 348/48; 348/49; 348/50; 348/51; 348/52; 348/53; 348/54; 348/55; 348/56; 348/57; 348/58; 348/59; 348/60; 348/806; 348/746

(58) Field of Classification Search
CPC .......... H04N 13/0011; H04N 13/0239; H04N 13/0055; H04N 13/0296; H04N 13/0497; H04N 13/0242
USPC .......................................................... 348/46
See application file for complete search history.

(56) References Cited

U.S. PATENT DOCUMENTS

| 6,141,034 | A  | * | 10/2000 | McCutchen ..................... 348/36 |
| 6,211,911 | B1 | * | 4/2001  | Komiya et al. ............ 348/218.1 |
| 7,015,954 | B1 | * | 3/2006  | Foote et al. ................ 348/218.1 |
| 7,428,000 | B2 | * | 9/2008  | Cutler et al. .............. 348/14.11 |
| 8,111,282 | B2 | * | 2/2012  | Cutler et al. ............... 348/14.01 |
| 2002/0122117 | A1 | * | 9/2002 | Nakagawa et al. ........... 348/218 |
| 2004/0016870 | A1 | * | 1/2004 | Pawlicki et al. ........... 250/208.1 |
| 2004/0247174 | A1 | * | 12/2004 | Lyons et al. .................. 382/154 |
| 2004/0263636 | A1 | * | 12/2004 | Cutler et al. ............. 348/211.12 |

(Continued)

FOREIGN PATENT DOCUMENTS

| JP | 2000-306096 A | 11/2000 |
| JP | 2002-262156 A | 9/2002  |

(Continued)

*Primary Examiner* — Andy Rao
*Assistant Examiner* — Shan Elahi
(74) *Attorney, Agent, or Firm* — Canon USA, Inc., IP Division

(57) ABSTRACT

An image processing apparatus executes a distortion correction on coordinates of a target pixel in a virtual viewpoint image based on distortion characteristics of a virtual camera and calculates coordinates in the virtual viewpoint image after the distortion correction. The image process apparatus calculates ideal coordinates in a captured image from the coordinates in the virtual viewpoint image after the distortion correction and calculates real coordinates in the captured image from the ideal coordinates in the captured image based on distortion characteristics of an imaging unit. The image process apparatus calculates a pixel value corresponding to the real coordinates from image data of the virtual viewpoint image and corrects the pixel value corresponding to the real coordinates based on ambient light amount decrease characteristics of the imaging unit and ambient light amount decrease characteristics of the virtual camera.

6 Claims, 28 Drawing Sheets

(56) References Cited

U.S. PATENT DOCUMENTS

| | | | |
|---|---|---|---|
| 2005/0035980 A1* | 2/2005 | Lonsing | 345/633 |
| 2005/0088424 A1* | 4/2005 | Morrison et al. | 345/173 |
| 2006/0023105 A1* | 2/2006 | Kostrzewski et al. | 348/335 |
| 2008/0170237 A1* | 7/2008 | Wysokowski et al. | 356/601 |
| 2009/0046139 A1* | 2/2009 | Cutler et al. | 348/14.08 |
| 2009/0189974 A1* | 7/2009 | Deering | 348/46 |
| 2010/0104262 A1* | 4/2010 | Kanamaru et al. | 386/95 |
| 2010/0302412 A1* | 12/2010 | Hayashi et al. | 348/241 |

FOREIGN PATENT DOCUMENTS

| | | |
|---|---|---|
| JP | 2004-088247 A | 3/2004 |
| JP | 2008-217243 A | 9/2008 |
| JP | 2009-266159 A | 11/2009 |

\* cited by examiner

FIG. 1A
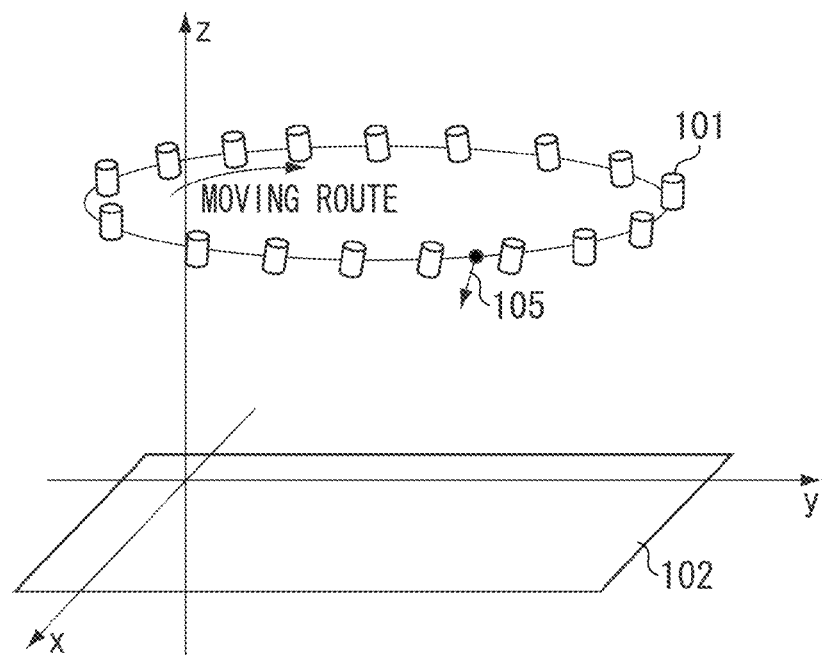
FIG. 1B
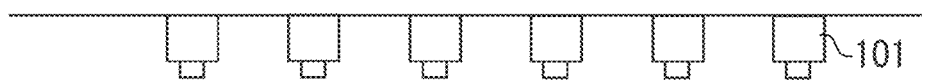
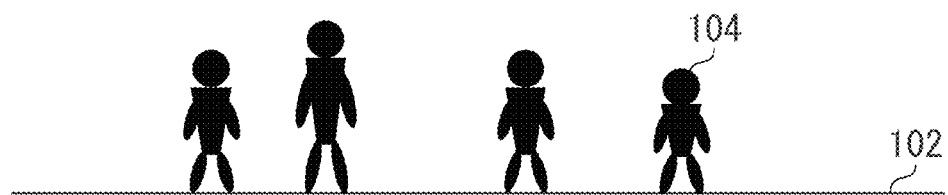

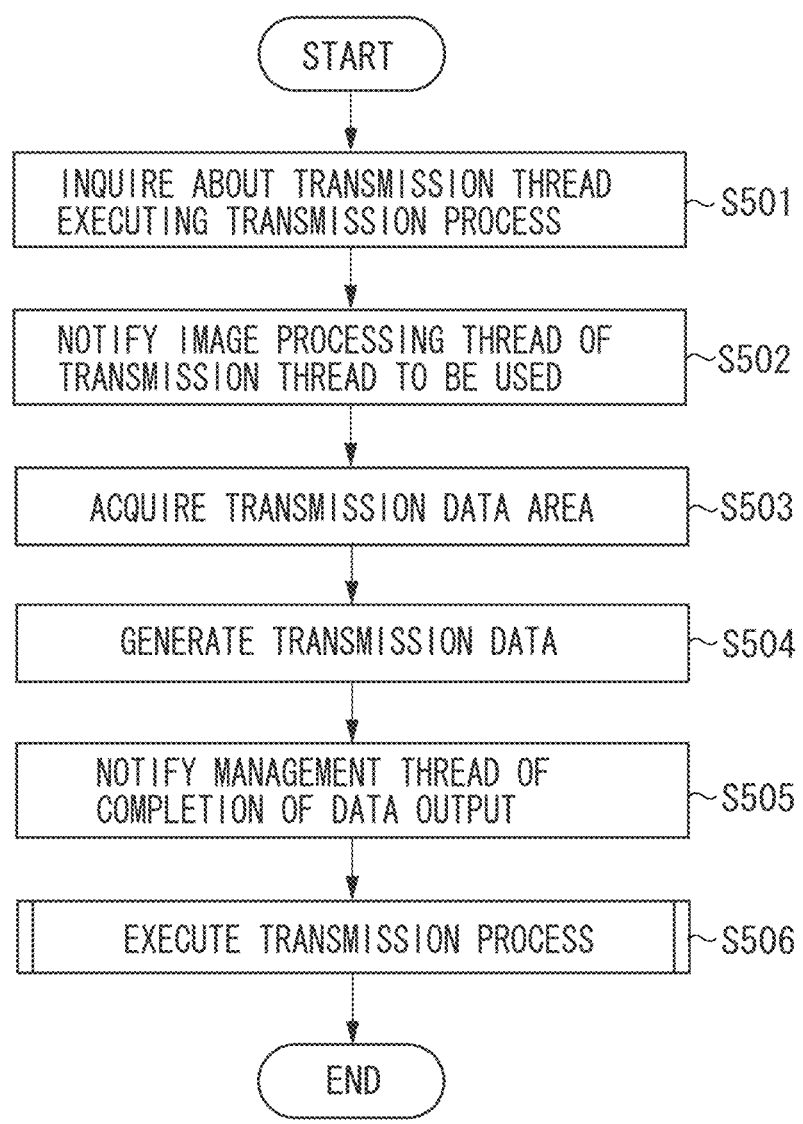

FIG. 6A

| Scenario Parameters / Display Time | Virtual Viewpoint Coordinates | | | Virtual Viewpoint Directions | | | Virtual Viewpoint Upward Direction Vectors | | | Angle of View (°) | Base Level Height | Distortion Strength $\alpha$ | Ambient Light Amount Decrease Strength $\beta$ |
|---|---|---|---|---|---|---|---|---|---|---|---|---|---|
| 0:00:00.00f | 3.8 | 0.0 | 5.0 | 1.0 | 0.0 | 0.0 | 0.0 | 0.0 | 1.0 | 128.0 | 0.00 | 0.20 | 0.50 |
| 0:00:00.01f | 3.9 | 0.0 | 5.0 | 1.0 | 0.0 | 0.0 | 0.0 | 0.0 | 1.0 | 127.8 | 0.00 | 0.19 | 0.48 |
| ... | | | | | | | | | | | | | |
| 0:04:59.29f | 9.8 | 4.7 | 6.8 | -1.0 | 0.0 | 0.0 | 0.0 | 0.0 | 1.0 | 176.3 | 0.00 | 0.30 | 0.30 |

FIG. 6B

| DISPLAY TIME \ CAMERA ID | 0 | 1 | 2 | 3 | 4 | 5 | 6 | ... | n-3 | n-2 | n-1 |
|---|---|---|---|---|---|---|---|---|---|---|---|
| 0:00:00.00f | 1 | 2 | 0 | 0 | 0 | 0 | 0 | | 0 | 0 | 0 |
| 0:00:00.01f | 1 | 2 | 0 | 0 | 0 | 0 | 0 | | 0 | 0 | 0 |
| 0:00:00.02f | 1 | 2 | 0 | 0 | 0 | 0 | 0 | | 0 | 0 | 0 |
| 0:00:00.03f | 0 | 1 | 2 | 0 | 0 | 0 | 0 | | 0 | 0 | 0 |
| ... | | | | | | | | | | | |
| 0:04:59.27f | 0 | 0 | 0 | 0 | 0 | 0 | 0 | | 1 | 2 | 0 |
| 0:04:59.28f | 0 | 0 | 0 | 0 | 0 | 0 | 0 | | 0 | 1 | 2 |
| 0:04:59.29f | 0 | 0 | 0 | 0 | 0 | 0 | 0 | | 0 | 1 | 2 |

FIG. 6C

| DISPLAY TIME | IMAGE PROCESSING PC ID 0 | 1 | 2 | 3 | 4 | 5 | 6 | 7 | 8 | 9 |
|---|---|---|---|---|---|---|---|---|---|---|
| 0:00:00.00f | 1 | 0 | 0 | 0 | 0 | 0 | 0 | 0 | 0 | 0 |
| 0:00:00.01f | 0 | 1 | 0 | 0 | 0 | 0 | 0 | 0 | 0 | 0 |
| 0:00:00.02f | 0 | 0 | 1 | 0 | 0 | 0 | 0 | 0 | 0 | 0 |
| 0:00:00.03f | 0 | 0 | 0 | 1 | 0 | 0 | 0 | 0 | 0 | 0 |
| ⋮ | | | | | | | | | | |
| 0:04:59.27f | 0 | 0 | 0 | 0 | 0 | 0 | 1 | 0 | 0 | 0 |
| 0:04:59.28f | 0 | 0 | 0 | 0 | 0 | 0 | 0 | 1 | 0 | 0 |
| 0:04:59.29f | 0 | 0 | 0 | 0 | 0 | 0 | 0 | 0 | 1 | 0 |

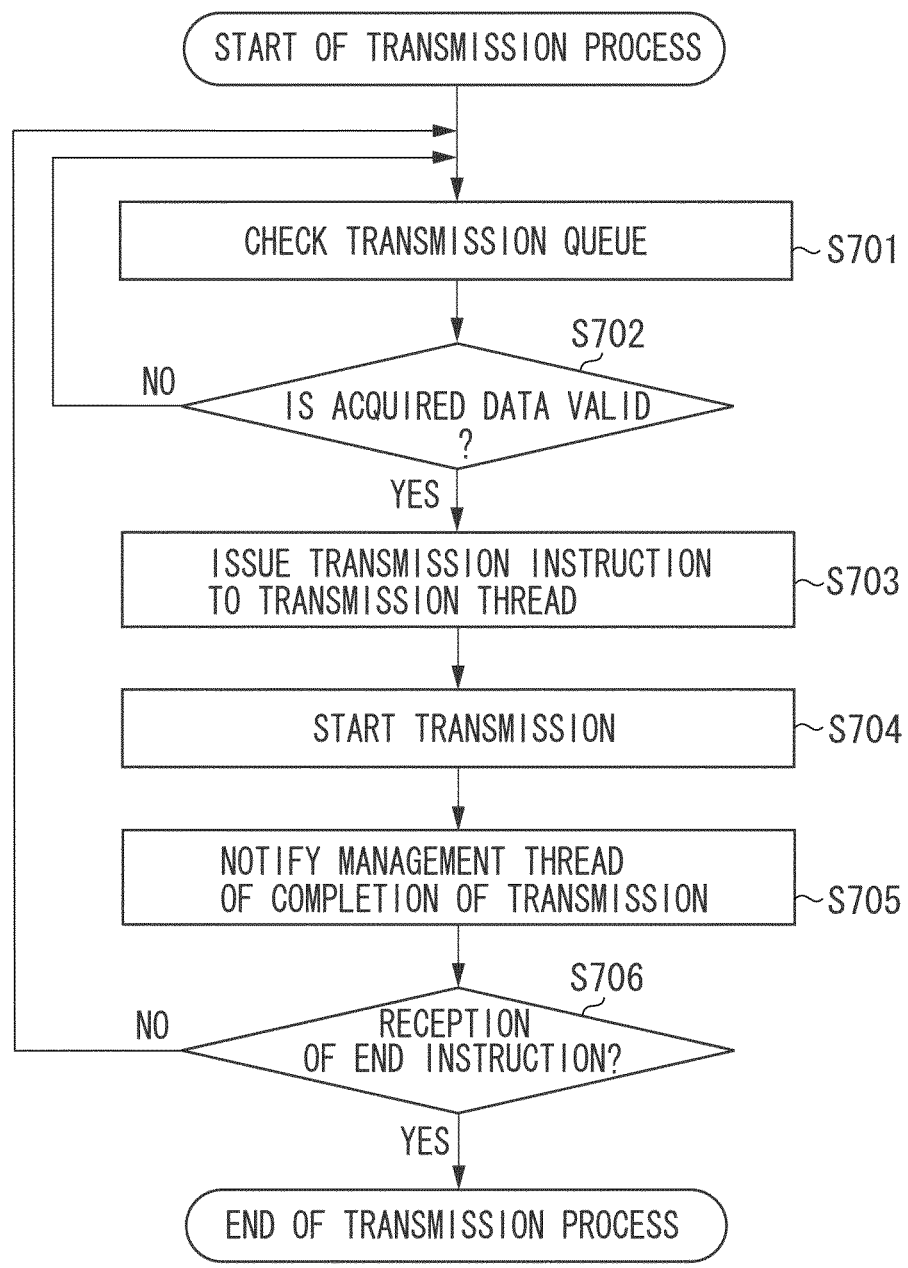

IMAGE PROCESSING APPARATUS AND METHOD

BACKGROUND OF THE INVENTION

1. Field of the Invention

The present invention relates to generation of a virtual viewpoint image from an image captured by an imaging unit having distortion characteristics and ambient light amount decrease characteristics (vignetting), based on distortion characteristics and ambient light amount decrease characteristics of a virtual camera.

2. Description of the Related Art

Japanese Patent Application Laid-Open No. 2004-088247 discusses a system to capture an identical scene by using a plurality of cameras and to display a video viewed from a moving virtual viewpoint (free viewpoint image). The simplest method to realize such system is arranging a plurality of cameras and continuously reproducing videos captured by these cameras while switching these cameras. As discussed by Japanese Patent Application Laid-Open No. 2004-088247, such an image reproducing apparatus adjusts brightness or color between different cameras to execute smooth video reproduction.

In addition, Japanese Patent Application Laid-Open No. 2008-217243 discusses image processing with use of a virtual camera arranged between cameras. According to this document, in addition to videos captured by real cameras, a video viewed from a virtual viewpoint is generated and used to increase continuity. In addition, according to a widely known technique of generating a virtual viewpoint video, object distance information is acquired from videos captured by a plurality of cameras and rendering is executed. When generating a virtual viewpoint video, since correspondence between a point on a virtual viewpoint video and a point on a real camera video is calculated geometrically, distortion and the like present in the real camera video are corrected. Since the virtual viewpoint video is subjected to geometrical projective transformation, a video without distortion as if captured by a pinhole camera can be created.

However, in such video without distortion created by projective transformation as if captured by a pinhole camera, object deformity of peripheral parts of the video is larger than that of a video captured by a real camera. As a result, the video appears unnatural. In addition, if object distance information is not successfully acquired, the virtual viewpoint video cannot be generated. Thus, it is difficult to create stable videos.

SUMMARY OF THE INVENTION

The present invention is directed to generating a virtual viewpoint image similar to an image captured by a real camera.

According to an aspect of the present invention, an image processing apparatus generates a virtual viewpoint image from a captured image acquired by an imaging unit having distortion characteristics and ambient light amount decrease characteristics, based on distortion characteristics and ambient light amount decrease characteristics of a virtual camera. The image processing apparatus includes: a first calculation unit configured to execute a distortion correction on coordinates of a target pixel in the virtual viewpoint image based on the distortion characteristics of the virtual camera and to calculate coordinates in the virtual viewpoint image after the distortion correction; a second calculation unit configured to calculate ideal coordinates in the captured image from the coordinates in the virtual viewpoint image after the distortion correction; a third calculation unit configured to calculate real coordinates in the captured image from the ideal coordinates in the captured image based on the distortion characteristics of the imaging unit; a fourth calculation unit configured to calculate a pixel value corresponding to the real coordinates from image data of the virtual viewpoint image; and a correction unit configured to correct the pixel value corresponding to the real coordinates based on the ambient light amount decrease characteristics of the imaging unit and the ambient light amount decrease characteristics of the virtual camera.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 1A and 1B are conceptual diagrams of an image reproducing apparatus according to a first exemplary embodiment.

FIG. 5 is a flow chart of a process of a capture PC.

FIG. 6A illustrates scenario data and FIGS. 6B and 6C illustrate display control information.

FIG. 7 is a flow chart of a transmission process executed by a capture PC.

FIGS. 15A to 16C illustrate alert display dialog boxes.

DESCRIPTION OF THE EMBODIMENTS

Figure 2:
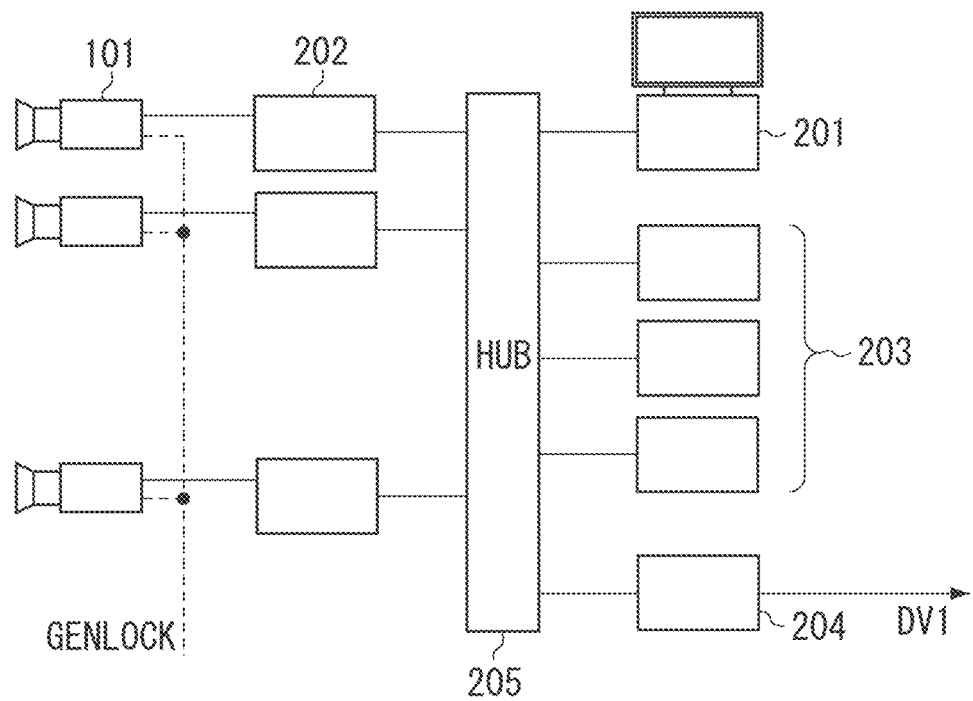
FIG. 2 illustrates a system configuration according to the first exemplary embodiment.

Various exemplary embodiments, features, and aspects of the invention will be described in detail below with reference to the drawings.

An image reproducing apparatus according to the first exemplary embodiment uses a plurality of fixed cameras (imaging units) to generate an image captured from a virtual viewpoint moving based on a predetermined scenario (FIG. 6A, for example) and displays the image in real time. FIGS. 1A and 1B are conceptual diagrams according to the first exemplary embodiment. As illustrated in FIG. 1A, the fixed cameras according to the first exemplary embodiment are arranged along the moving route of the virtual viewpoint, so that the cameras have overlapping imaging areas. FIG. 1A illustrates imaging cameras 101 and a floor 102, and the cameras 101 are hung on and fixed by a metal frame (not illustrated). As illustrated in FIG. 1, the virtual viewpoint is set based on a coordinate system in which the x-y plane includes the floor 102 and the z-axis represents a height direction.

Scenario data according to the first exemplary embodiment includes virtual viewpoint coordinates, directions, and upward direction vectors representing the position, direction, and orientation of the virtual viewpoint in each frame during the display time. The virtual viewpoint coordinates and directions represent the position and the orientation of the virtual viewpoint in this coordinate system, respectively. The virtual viewpoint upward direction vectors are parameters specifying how much a view is tilted with respect to the orientation of the virtual viewpoint. The virtual viewpoint directions are perpendicular to the virtual viewpoint upward direction vectors. In addition to the above data, the scenario data includes view angles. In this way, a view from the virtual viewpoint can be displayed.

According to the first exemplary embodiment, since the scenario data further includes lens effect parameters (distortion strength α and ambient light amount decrease strength β), the image reproducing apparatus can generate a natural video from videos captured by the plurality of fixed cameras, as if captured by actually moving a camera. In addition, the scenario data includes base level height information, which is a parameter used in a virtual viewpoint video generation process. The base level height information affects smoothness when the camera being used is switched. For example, in the first exemplary embodiment, when only a few people are present, it is desirable that the floor be set as the base level. However, when many people are preset in the imaging area, if the base level is set to the average height of the people, a smooth video is obtained.

Since the scenario data includes the base level height information, the base level height can be changed depending on the state of the object(s). The base level height may be changed manually or automatically based on images captured by the imaging cameras 101.

FIG. 1B is a conceptual diagram obtained by projecting FIG. 1A into a two-dimensional plane and illustrates a scene including a plurality of people. FIG. 1B illustrates people 104 as objects and a virtual viewpoint 105.

FIG. 2 illustrates a system realizing the first exemplary embodiment. In this system, a management server PC 201 manages the entire system. Since the management server PC 201 controls the entire system, only the management server PC 201 is connected to operation devices such as a console screen, a keyboard, and a mouse. Each of the imaging cameras 101 is connected to a capture PC 202 via a high definition serial digital interface (HD-SDI) cable and transmits a video to an image processing PC 203 via the capture PC 202. For example, in the first exemplary embodiment, since the output resolution of the imaging cameras 101 is full high definition (HD) (1920×1080 pixels and 30 frames per second), the data amount is very large. Thus, if all the imaging cameras 101 transmit a video at once, since all bands of the communication paths are used up, a problem is caused. Thus, display control information (FIGS. 6B and 6C) for displaying a predetermined scenario with use of currently available cameras and PCs is generated, and based on this information, transmission of video data is controlled. The display control information includes correspondence relation between videos captured by the imaging cameras 101 and the image processing PCs 203 processing the videos, for each frame between the display start time and the display end time. For example, in the first exemplary embodiment, the display control information includes camera control information (FIG. 6B) and PC control information (FIG. 6C). Based on the camera control information, value 0 represents non-transmission of video data, value 1 represents transmission of video data, and value 2 represents transmission of only the head information. In addition, based on the PC control information, value 1 represents use of a corresponding PC and value 0 represents non-use of the corresponding PC. As illustrated in FIGS. 6A and 6B, the time included in the display control information is relative to the display start time 0:00:00.00f.

The image processing PCs 203 receive and process image data transmitted from the capture PCs 202 and transmit the processed image data to the image display PC 204. The image display PC 204 receives and buffers the video transmitted from the image processing PCs 203 and displays the buffered video at a timing specified by the management server PC 201. Each of these PCs is connected to each other via a local area network (LAN) using a network hub 205 and uses TCP/IP for data transmission and reception. Functions of each of the PCs will be described in detail later. In addition, since all the imaging cameras 101 need to be synchronized with each other, the imaging cameras 101 receive a synchronization signal (GenLock).

A computer (processor) realizes the functions described with reference to the following flow charts, by reading program codes recorded in a recording medium such as a read-only memory (ROM) of each of the PCs. Instead of causing a computer to execute all the functions based on programs, certain functions may be realized by using circuits.

Figure 3:
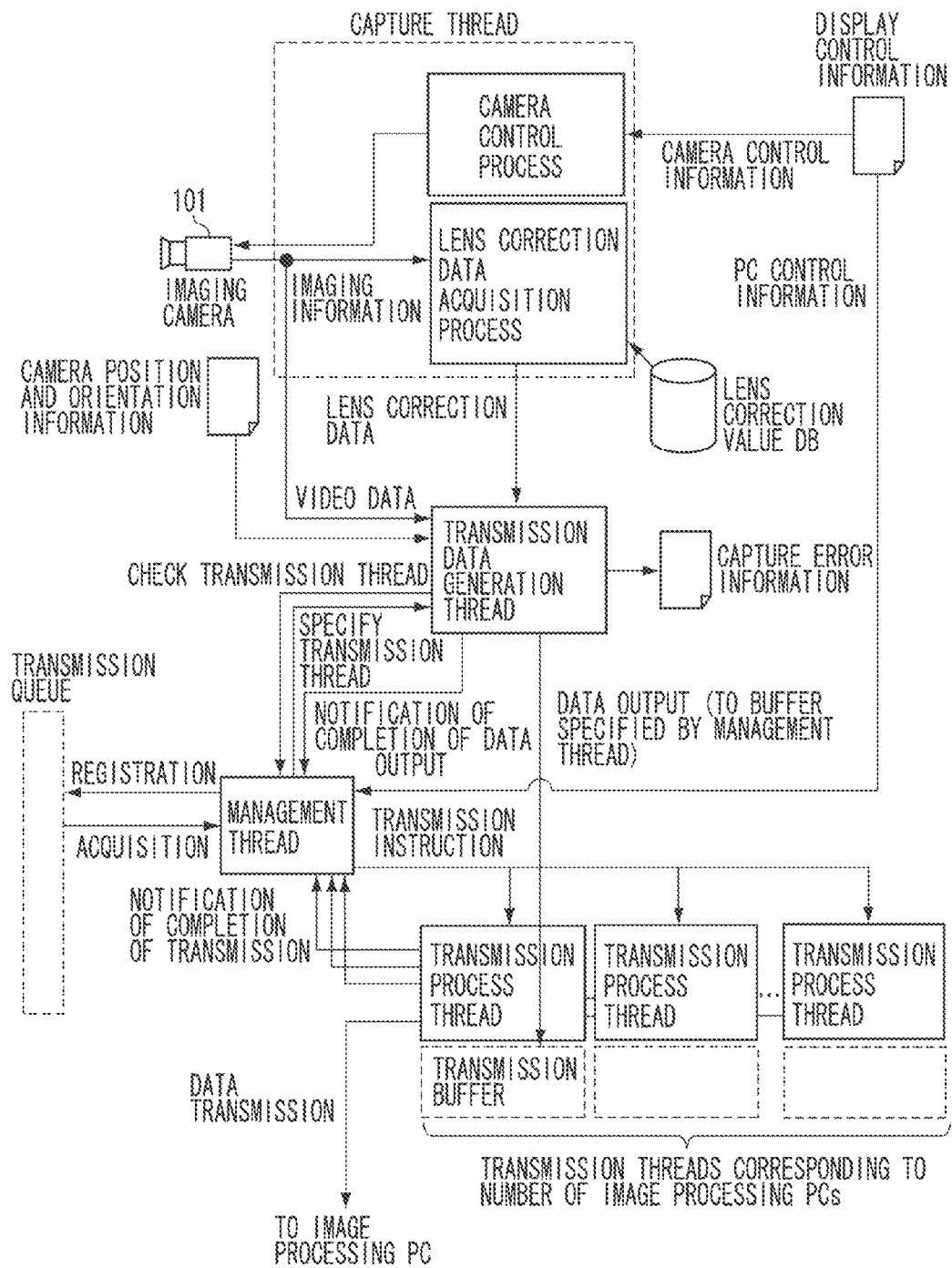
FIG. 3 illustrates overall processes of a capture PC.
Figure 4:
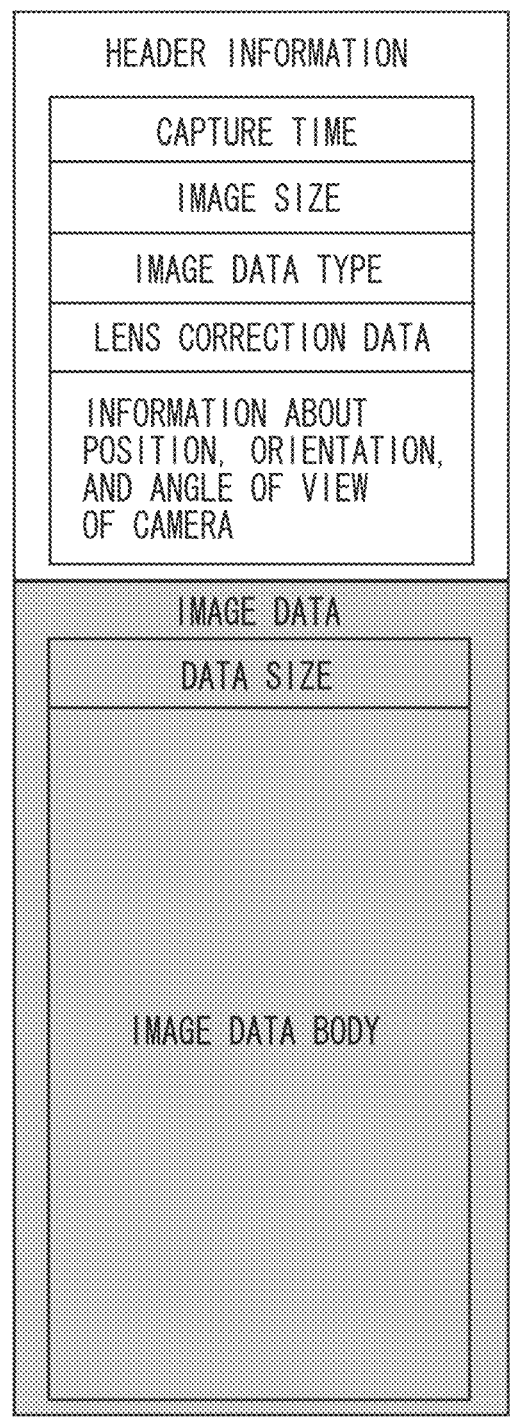
FIG. 4 illustrates a format of image data transmitted from a capture PC to an image processing PC.

The capture PCs 202 capture videos from the imaging cameras 101 and transmit the captured videos to the image processing PCs 203. FIG. 3 illustrates overall processes executed by each of the capture PCs 202. If a problem is caused due to bands of the transmission paths, transmission of received data may be delayed. Thus, each of the capture PCs 202 has a function of buffering data for a predetermined number of seconds. In addition, the virtual viewpoint video generation process executed by the image processing PCs 203 requires lens characteristics data at the time of imaging. However, it is known that the lens characteristics data changes depending on imaging settings (for example, f value, angle of view, and imaging distance) of a camera. Thus, each of the capture PCs 202 acquires the lens correction data in accordance with the imaging settings from a lens correction value database. Each of the capture PCs 202 adds the acquired lens correction data to image data and transmits the combined data to a corresponding image processing PC 203 (FIG. 4). The lens correction data may include various correction data about the distortion, the ambient light amount, and the chromatic aberration of magnification. In the first exemplary embodiment, for simplicity, the lens correction value database stores correction data of the distortion and the ambient light amount. In addition, to generate a virtual viewpoint video, information about the position, direction, orientation, angle of view, and the like of each of the imaging cameras 101 is necessary. Thus, these pieces of information are also added to the image data.

As described above, the capture PCs 202 transmit data based on TCP/IP. However, it is not efficient to cause the capture PCs 202 to connect to the image processing PCs 203 each time the capture PCs 202 transmit data. Thus, each of the capture PCs 202 includes threads for executing a transmission process, the number of the threads corresponding to the number of the image processing PCs 203. FIG. 5 is a flow chart of the transmission process. In addition to the transmission process threads, each of the capture PCs 202 includes: a transmission data generation thread for receiving a video from a corresponding imaging camera 101, adding header information and lens correction data, and generating data to be transmitted; and a management thread for managing the transmission process threads. First, in step S501, the transmission data generation thread inquires of the management thread about a transmission process thread to be used. In step S502, based on display control information transmitted from the management server PC 201, the management thread selects an image processing PC 203 to which the data is transmitted and notifies the transmission data generation thread of the transmission process thread connected to the selected image processing PC 203.

In step S503, the transmission data generation thread acquires a transmission data area in a transmission buffer of the thread specified by the management thread. Next, in step S504, the transmission data generation thread outputs transmitted data generated from the captured video to the acquired transmission data area. In step S505, the transmission data generation thread notifies the management thread of completion of data output. In step S506, upon receiving the notification of completion of data output, the management thread adds the data to a transmission queue and executes the transmission process in FIG. 7.

FIG. 7 is a flow chart of the transmission process. First, in step S701, the management thread checks initial data of the transmission queue supplied with the management thread. If the transmission queue is empty, the management thread is brought in a standby state until receiving the notification transmitted from the transmission data generation thread in step S505. If the transmission queue is not empty, in step S702, the management thread determines whether the data is valid or not. If the difference between a capture time T0 stored in the header information of the target data and a display start time T1 corresponding to the target data in the display control information does not exceed a predetermined time TL (YES in step S702), the management thread determines the data to be valid. Otherwise (NO in step S702), the management thread determines the data to be invalid. If the management thread determines the data to be invalid (No in step S702), the management thread skips the transmission process and the operation returns to step S701. On the other hand, if the management thread determines the data to be valid (YES in step S702), in step S703, the management thread issues a transmission instruction to the transmission process thread to execute the transmission process. The management thread selects this transmission thread based on the PC control information included in the display control information. In step S704, upon receiving the transmission instruction, the transmission process thread notifies the management thread of start of transmission and starts the transmission. In step S705, upon completion of transmission, the transmission process thread notifies the management thread of completion of transmission and returns to a standby state. In step S706, if the management thread is notified of completion of transmission but does not received an end instruction of the capture process yet (NO in step S706), the operation returns to step S701. On the other hand, if the management thread receives an end instruction of the capture process (YES in step S706), the management thread ends the transmission process.

Whether the transmitted image data needs to be compressed can be specified by a setting file. If the data needs to be compressed, the image data type in FIG. 4 represents 1. If not, the image data type represents 0. In addition, if only the header needs to be transmitted, the image data type represents 2. Compression of video data needs to be executed per frame. While a joint photographic experts group (JPEG) format is normally used as a compression format, in the first exemplary embodiment, direct X texture compression (DXTC) is used. DXTC can compress image data at a very high speed by using a graphics process unit (GPU), and therefore, when real-time processing is crucial as in the exemplary embodiment, DXTC is effective.

When capturing a video from a corresponding imaging camera 101, the transmission data generation thread grasps a capture error rate. In this way, the transmission data generation thread can transmit the state of the imaging camera 101 when responding to a validity determination process executed by the management server PC 201. For example, when the distance between the imaging camera 101 and the capture PC 202 is great (over 100 meters, for example) and a video of 30 frames per second cannot be acquired properly, a capture error may be generated. For example, in the first exemplary embodiment, when the number of frames that cannot be acquired exceeds 10% of the number of frames that need to be captured, the number of capture errors is determined to be many.

Figure 8:
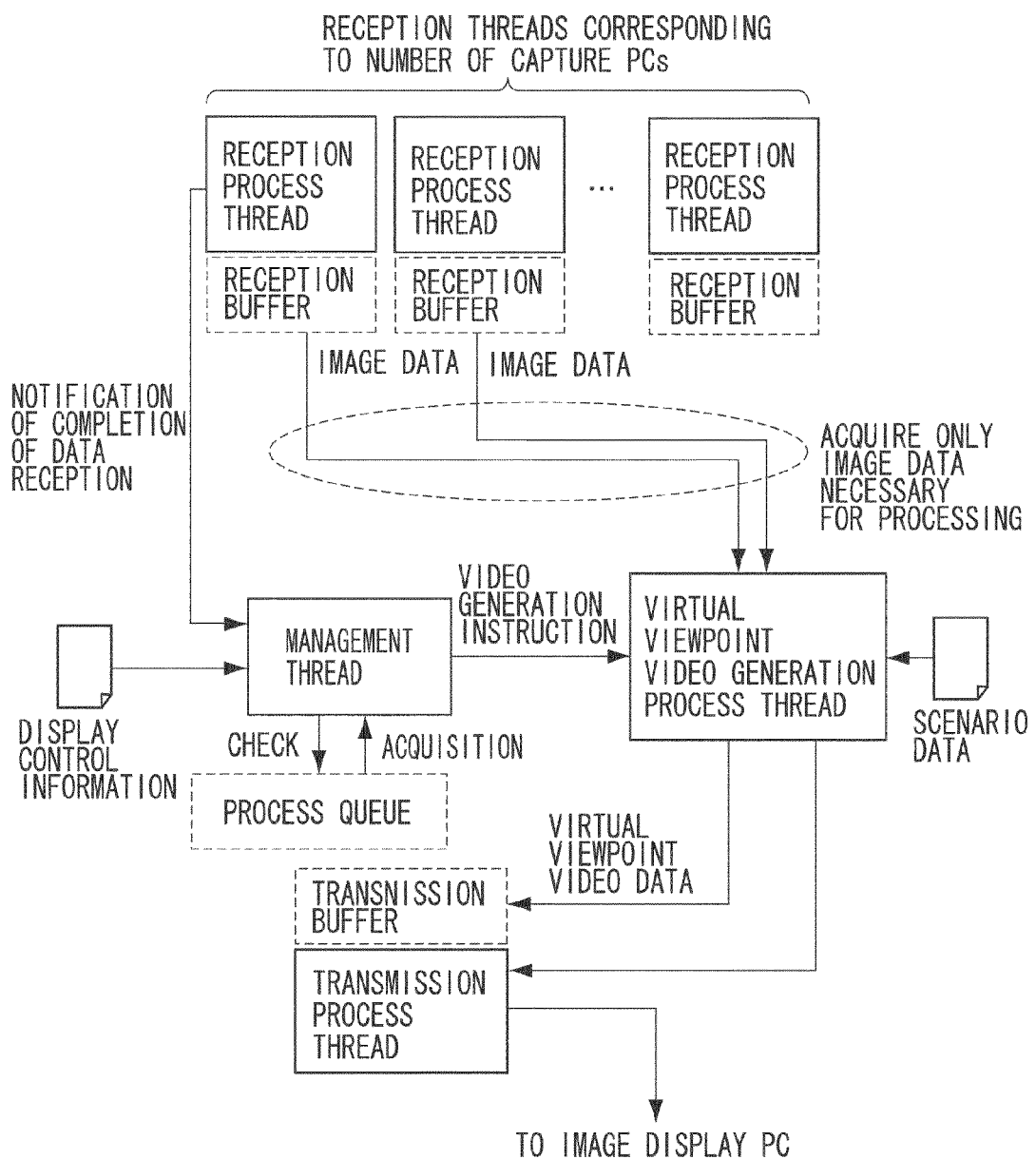
FIG. 8 illustrates overall processes of an image processing PC.

The image processing PCs 203 process videos transmitted from the capture PCs 202 and transmit the processed videos to the image display PC 204. FIG. 8 illustrates overall process of an image processing PC 203. As in the capture PCs 202, to maintain connection with all the capture PCs 202, the image processing PC 203 activates data reception threads, the number of which corresponds to the number of the capture PCs 202.

Figure 9:
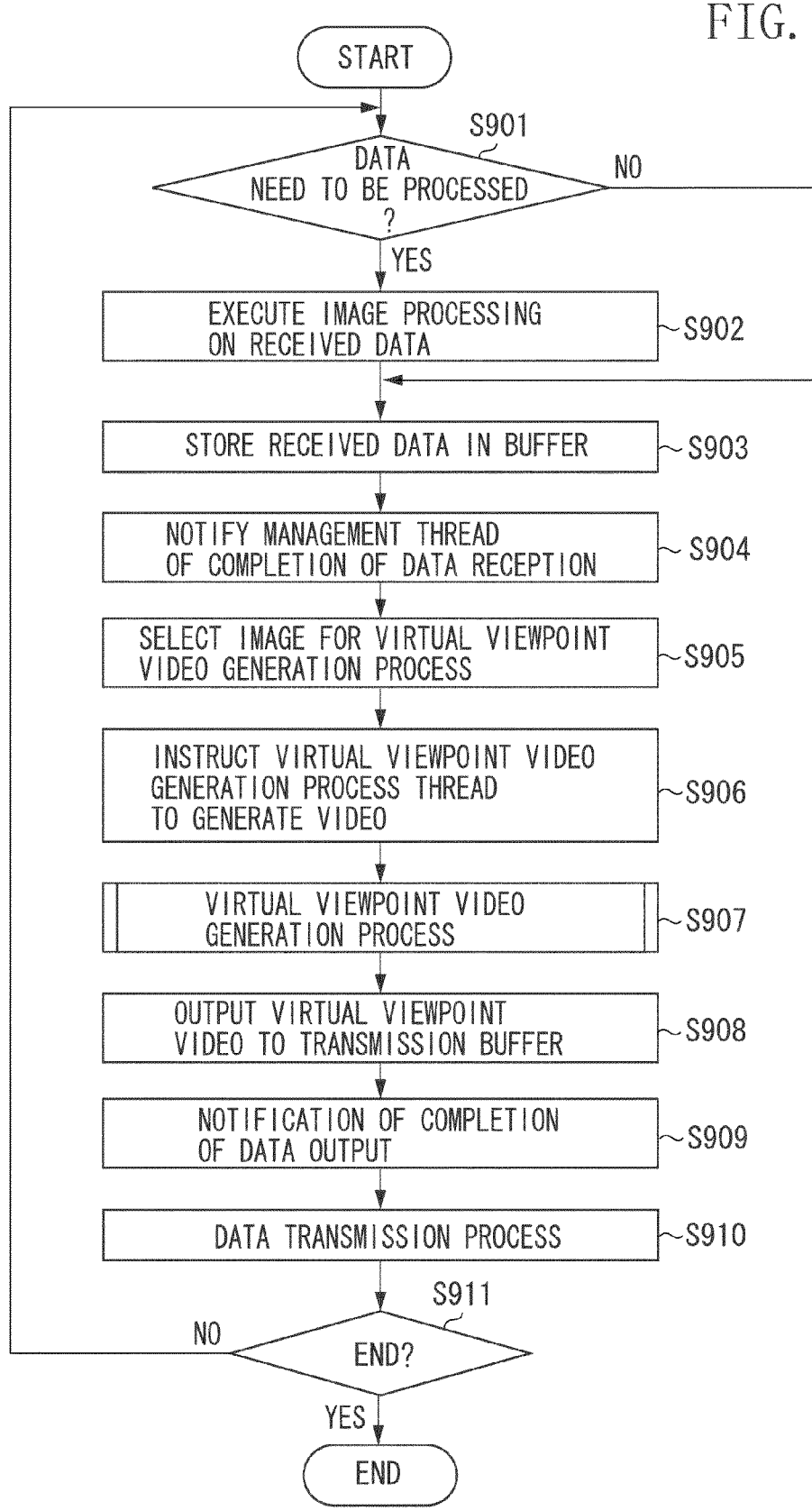
FIG. 9 is a flow chart of a process of an image processing PC.

FIG. 9 is a flow chart of a process of an image processing PC 203. First, in steps S901 and S902, a reception process thread processes received data based on the image data type. Next, in step S903, the reception process thread stores the processed data in a receiving buffer. In the first exemplary embodiment, as a process based on the image data type, when the image data type represents 1, the reception process thread decompresses compressed data to convert the compressed data into uncompressed data (image data type=0). After storing the received data in the receiving buffer, in step S904, the reception process thread notifies the management thread of completion of data reception.

Next, in step S905, the management thread selects an image based on the display control information. In step S906, the management thread issues a video generation instruction to a virtual viewpoint video reproduction process thread. However, after issuing the video generation instruction, the management thread blocks another video generation instruction until the management thread receives a notification of completion of data output from the virtual viewpoint video generation thread. This is because, if the virtual viewpoint video reproduction process thread simultaneously executes a plurality of virtual viewpoint video generation processes, the throughput of the video generation process that is being executed is decreased. As a result, possibility for failure of real-time reproduction is increased.

Upon receiving the video generation instruction, in step S907, the virtual viewpoint video generation thread uses the video and the display time selected by the management thread to generate a video based on the scenario. The virtual viewpoint video generation process will be described in detail later. In step S908, the virtual viewpoint video generation thread outputs the generated video to a transmission buffer. Next, in step S909, the virtual viewpoint video generation thread notifies the management thread and the transmission process thread of completion of data output.

Figure 10:
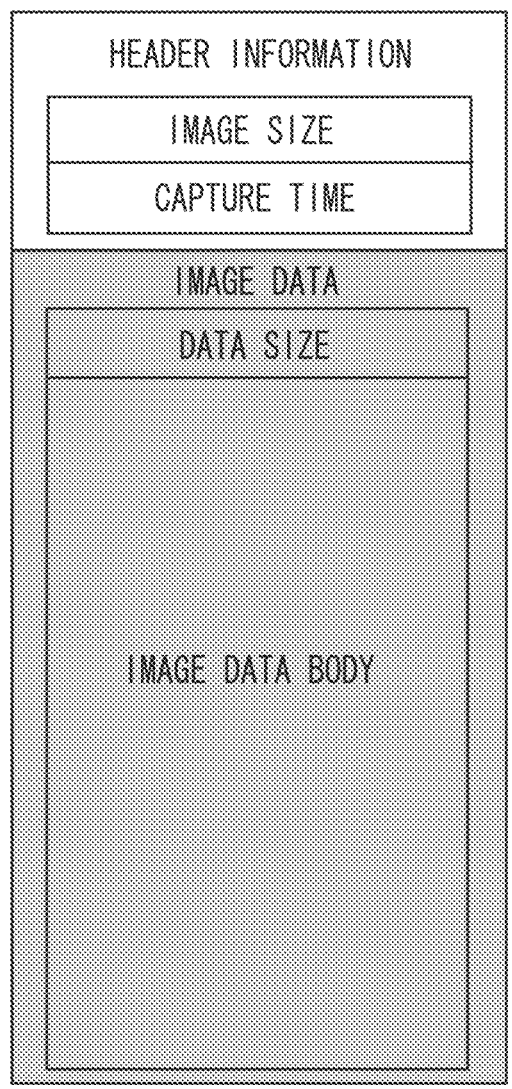
FIG. 10 illustrates a format of data transmitted from an image processing PC to an image display PC.

Upon receiving the notification of completion of data output, in step S910, the transmission process thread transmits the generated virtual viewpoint video data to the image display PC 204. As illustrated in FIG. 10, the capture time and the image resolution of the video are added as header information to the transmitted video data.

In step S911, if the transmission thread does not receive an end instruction of the capture process, the operation returns to step S901. Otherwise (YES in step S911), the transmission thread ends the transmission process.

Figure 11:
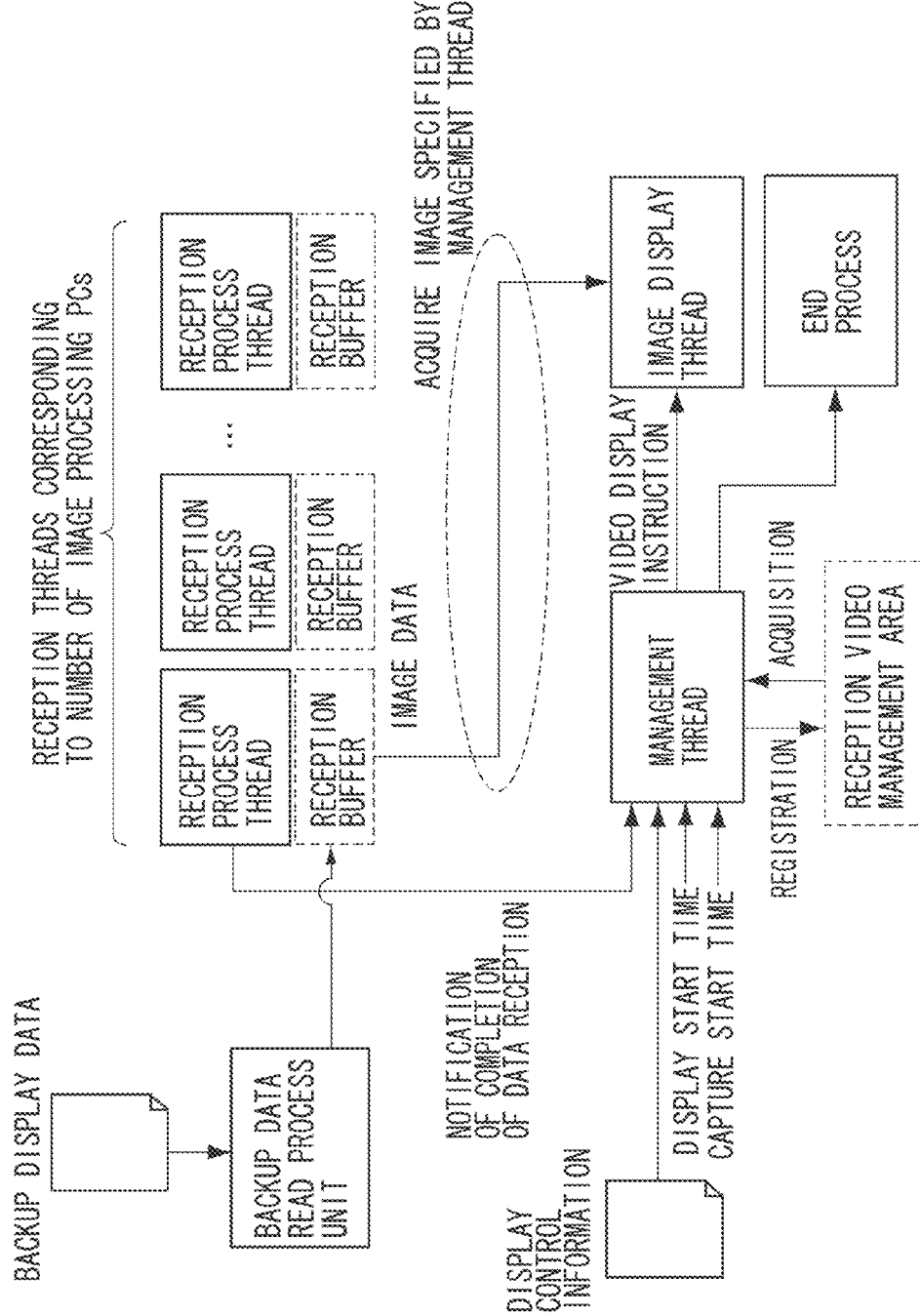
FIG. 11 illustrates overall processes of an image display PC.

The image display PC 204 has the following functions: (a) reproduction of data received from the image processing PCs 203 (normal display) and (b) display of a backup video (backup display). FIG. 11 illustrates overall processes of the image display PC 204. As with the image processing PCs 203, the image display PC 204 includes reception threads, the number of which corresponds to the number of the image processing PCs 203. Each of the reception threads has a reception buffer for buffering received data. Since the image display PC 204 includes a large capacity memory, the image display PC 204 can buffer all the videos to be displayed. This is necessary to generate a backup video.

Figure 12:
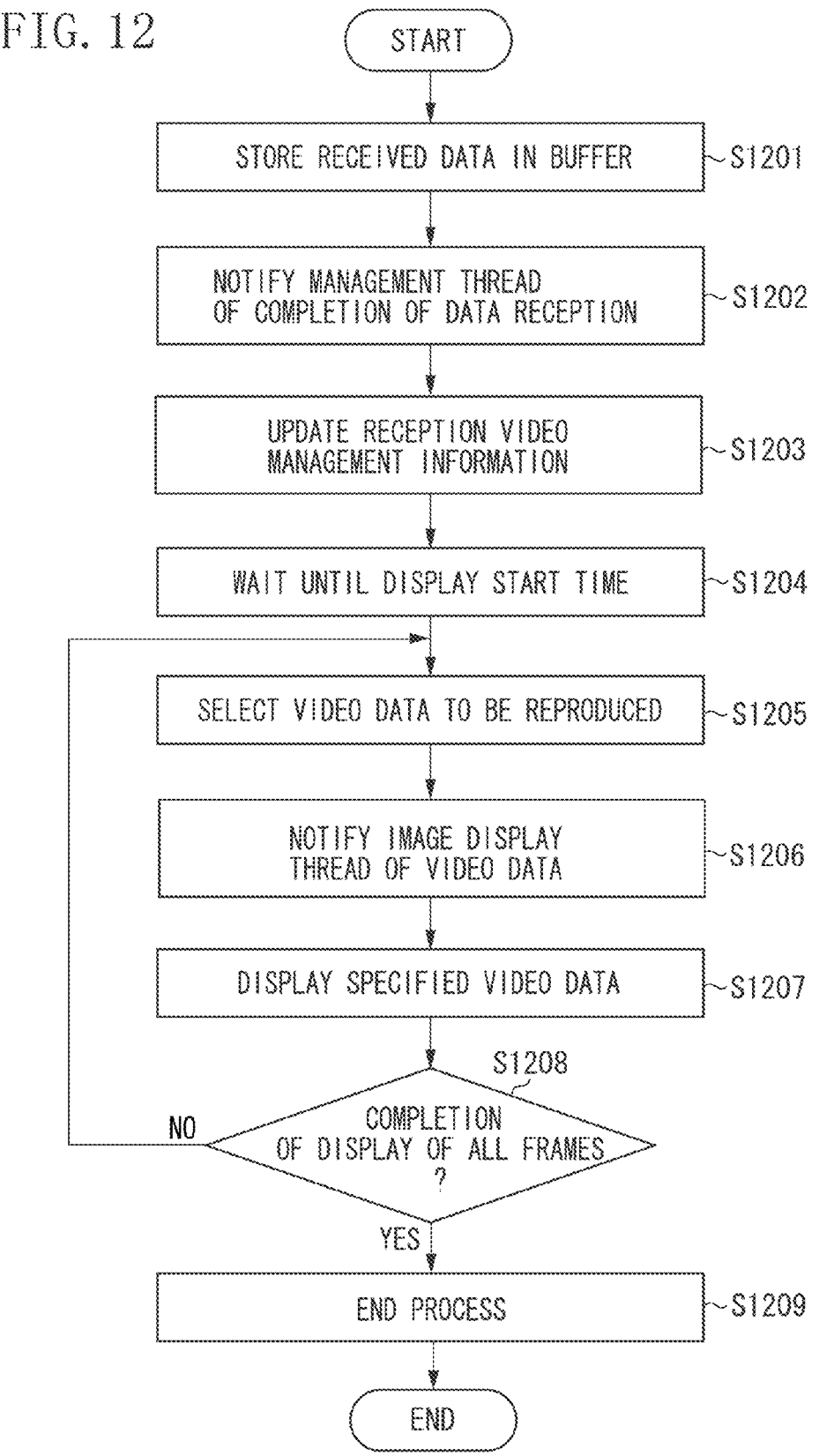
FIG. 12 is a flow chart of a normal display process.

FIG. 12 is a flow chart of a normal display process. First, in step S1201, a reception process thread receives a video from an image processing PC 203 and stores the video in a corresponding reception buffer. In step S1202, each time the reception process thread completes reception of a single frame of a video, the reception process thread transmits a notification of completion of data reception to the management thread. Upon receiving the notification of completion of data reception, in step S1203, the management thread updates reception video management information in a reception video management area. The reception video management information includes the capture time of the received video data and the identification ID of the reception process thread. In step S1204, the management thread waits until the display start time and executes a display management process from the display start time to the display end time. In step S1205, in the display management process, the management thread selects a video (frame) data to be reproduced from a reception buffer. Next, in step S1206, the management thread notifies an image display thread of the data. The management thread selects the video data by using the capture time of each video data in the reception video management area or the identification ID of the reception process thread. In the display control information, the time is described relative to the display start time used as a reference. Thus, the capture time to be reproduced is calculated by using the capture start time and an image corresponding to this time is obtained.

In step S1207, the image display thread displays the specified video data. In step S1208, the image display thread determines whether the reproduction process has been executed on all the frames. If all the frame images have been displayed (YES in step S1208), in step S1209, the management thread executes an end process. If corresponding video data is not present because of a process delay or the like, the image display thread continuously displays the previously displayed video, instead of updating the displayed video. If frames are lost, the display time could be extremely shortened or the video could be displayed unnaturally. However, based on the above process, such a problem can be avoided.

In the end process in step S1209 according to the first exemplary embodiment, the management thread stores all the frame data in a file. This file is used as a backup video. When a video is displayed a plurality of times, the management thread may store all the displayed videos or only the videos with no missing frames.

Figure 13:
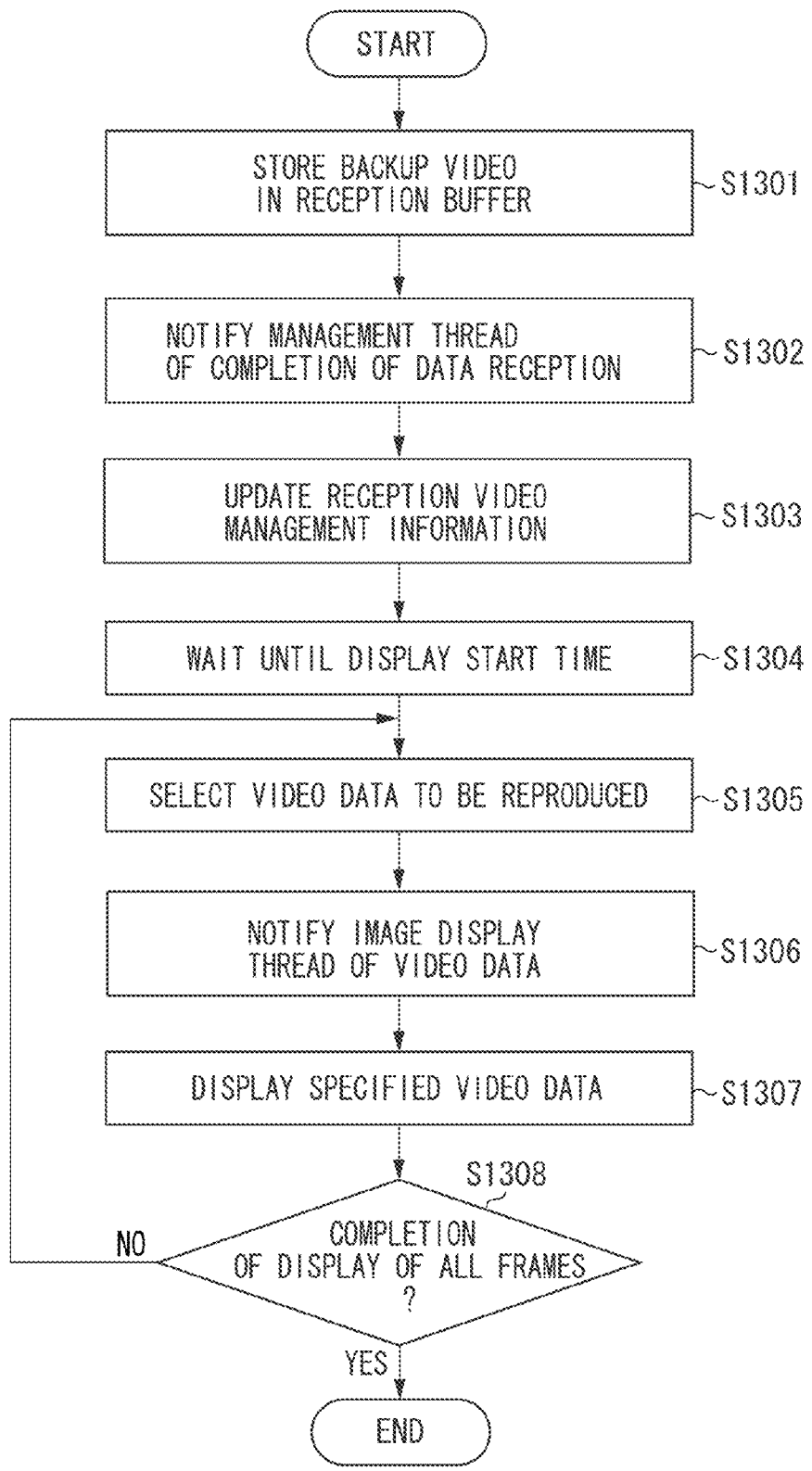
FIG. 13 is a flow chart of a backup display process.

If failure is caused in a plurality of cameras or PCs, proper video display may not be executed. In such case, the management server PC 201 executes a determination process and switches to backup display. In the first exemplary embodiment, among the files stored as normal display videos, the latest file is used as a backup display video. Needless to say, a predetermined file may be displayed. FIG. 13 is a flow chart of the backup display process. First, in step S1301 of this backup display process, instead of executing the reception process, the image display PC 204 reads backup video data on the memory. The subsequent operations (steps S1302 to S1308) are the same as those in the normal display process (steps S1202 to S1208). However, in the backup display process, the displayed data is not output to a file.

The management server PC 201 manages the entire system. More specifically, the management server PC 201 includes the following functions: (a) determination of validity of the PCs 202 to 204 and the imaging cameras 101 included in the system; (b) change of the video buffering time of each of the PCs 202 to 204; (c) generation of display control information based on a and b; (d) distribution of scenario data and display control information; and (e) distribution of setting files of the capture PCs 202 and the image processing PCs 203.

Figure 14:
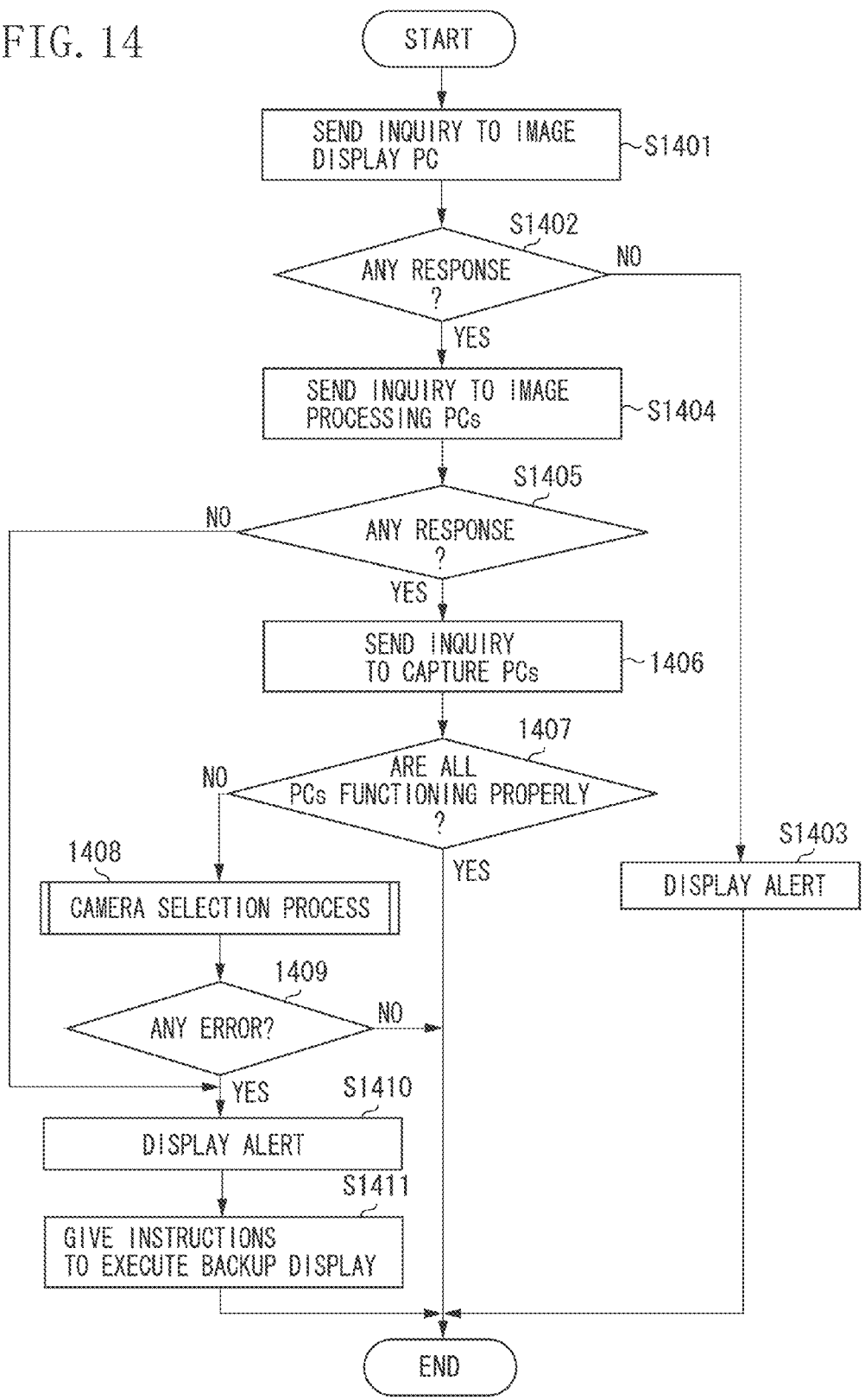
FIG. 14 is a flow chart of a process for determining validity of cameras and PCs.

Hereinafter, a process of determining validity of the PCs 202 to 204 and the imaging cameras 101 swill be described. FIG. 14 is a flow chart of a validity determination process. First, in step S1401, the management server PC 201 transmits an inquiry to the image display PC 204. Next, in step S1402, the management server PC 201 checks whether the management server PC 201 receives any response from the image display PC 204 within a predetermined time TA. The image display PC 204 and the image processing PCs 203 return value 0 as a response to the inquiry. Each of the capture PCs 202 returns value 1 if the capture PC recognizes a corresponding imaging camera 101. The capture PC 202 returns value 2 if the capture PC 202 recognizes the corresponding imaging camera 101 and determines that the imaging camera 101 causes many capture errors. In other cases, the capture PC 202 returns value 0.

Figure 15A:
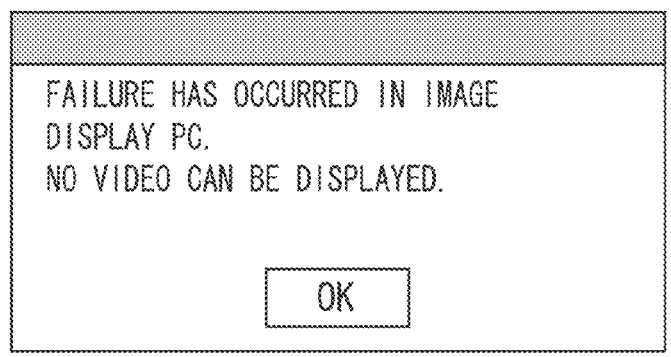
Figure 15B:
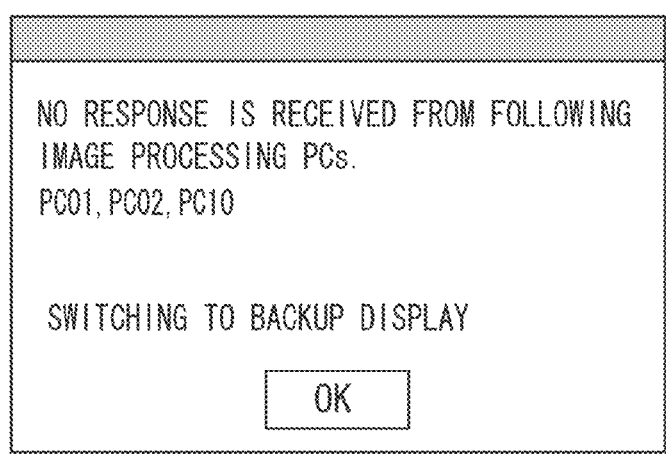

If the management server PC 201 does not receive any response from the image display PC 204 (NO in step S1402), display cannot be executed. Thus, in step S1403, the management server PC 201 displays an alert as illustrated in FIG. 15A to encourage exchange of the image display PC 204 and ends this validity determination process. If the management server PC 201 receives a response from the image display PC 204 (YES in step S1402), the management server PC 201 determines that the image display PC 204 functions properly. Thus, in step S1404, the management server PC 201 transmits an inquiry to each of the image processing PCs 203. Next, in step S1405, the management server PC 201 checks whether the management server PC 201 receives a response from each of the image processing PCs 203 within the predetermined time TA. If the management server PC 201 does not receive a response from any one of the image processing PCs 203 (NO in step S1405), in step S1410, the management server PC 201 displays an alert as illustrated in FIG. 15B. In step S1411, the management server PC 201 instructs the image display PC 204 to display a backup video and ends the validity determination process. If the management server PC 201 determines that the image processing PCs 203 function properly (YES in step S1405), in step S1406, the management server PC 201 transmits an inquiry to the capture PCs 202. If the management server PC 201 does not receive any response from any one of the capture PCs 202 or receives a response indicating value 1 or 2, namely, other than 0 (NO in step S1407), in step S1408, the management server PC 201 executes a camera selection process. The management server PC 201 executes this camera selection process for generating display control information so that a video is displayed based on a scenario by using the imaging cameras 101 excluding unusable imaging cameras 101. The camera selection process will be described in detail later. If the process time of the virtual viewpoint video generation process executed by the image processing PCs 203 is longer than the frame reproduction time by the image display PC 204 (for example, in the case of display of 30 frames per second, the frame reproduction time is $\frac{1}{30}$ second), real-time reproduction cannot be executed. Thus, the system according to the first exemplary embodiment includes a plurality of image processing PCs 203 to enable interleaving. For example, if the system includes ten image processing PCs 203, it is only necessary that each of the image processing PCs 203 executes the virtual viewpoint video generation process within less than $\frac{1}{3}$ second.

Figure 15C:
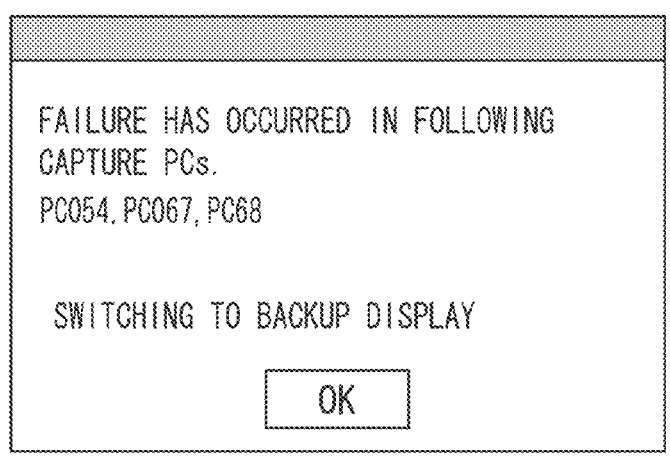

If an error is caused in the camera selection process (YES in step S1409), in step S1410, the management server PC 201 displays an alert as illustrated in FIG. 15C. In step S1411, the management server PC 201 instructs the image display PC 204 to display a backup video and ends the validity determination process.

In the first exemplary embodiment, setting files of the applications executed by the PCs in the display system are stored in a shared folder available to each of the PCs. Thus, the management server PC 201 can change the settings by accessing the shared folder available to each of the PCs. In this way, for example, the management server PC 201 determines the image buffering time of each of the PCs and instructs the image display PC 204 to display a backup video.

In the virtual viewpoint video generation process according to the first exemplary embodiment, a plane having a certain height is used as a base level, and a video is generated so that an object on this base level is smoothly displayed during cameras switching. In this virtual viewpoint video generation process, the following video correction, conversion, and video effect addition are consistently executed: (1) correction of the distortion and the chromatic aberration of magnification of a camera video; (2) correction of the ambient light amount decrease; (3) parsing transformation between a virtual viewpoint video and a camera image; (4) addition of the ambient light amount decrease effect to a virtual viewpoint video; and (5) addition of a distortion effect. In the first exemplary embodiment, a virtual viewpoint image is generated from an image captured by a camera having distortion characteristics and ambient light amount decrease characteristics, based on distortion characteristics and ambient light amount decrease characteristics of a virtual camera. In the virtual viewpoint video generation process according to the first exemplary embodiment, the above operations are consistently executed to realize a high level of efficiency. Thus, since the image processing apparatus according to the first exemplary embodiment requires real-time processing, this virtual viewpoint video generation process is suitable.

Figure 16A:
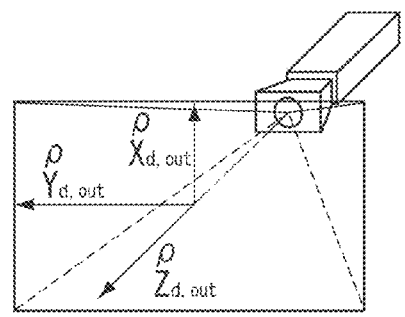
FIGS. 16A and 16B illustrate parameters used in a virtual viewpoint video generation process.
Figure 16B:
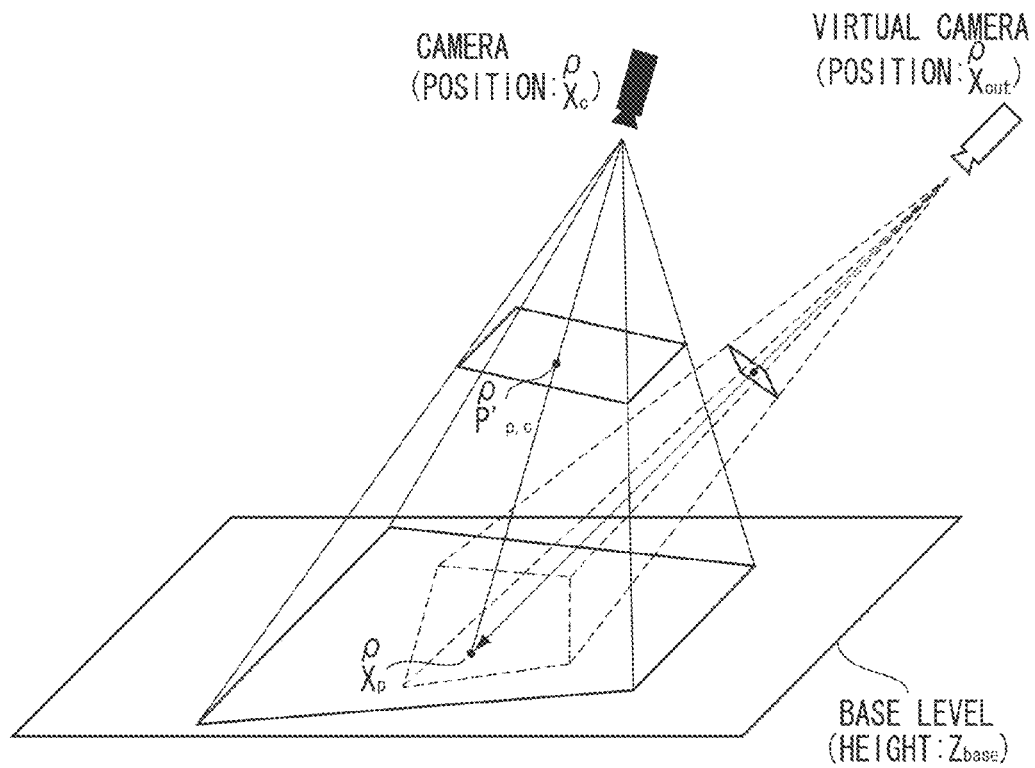
Figure 17:
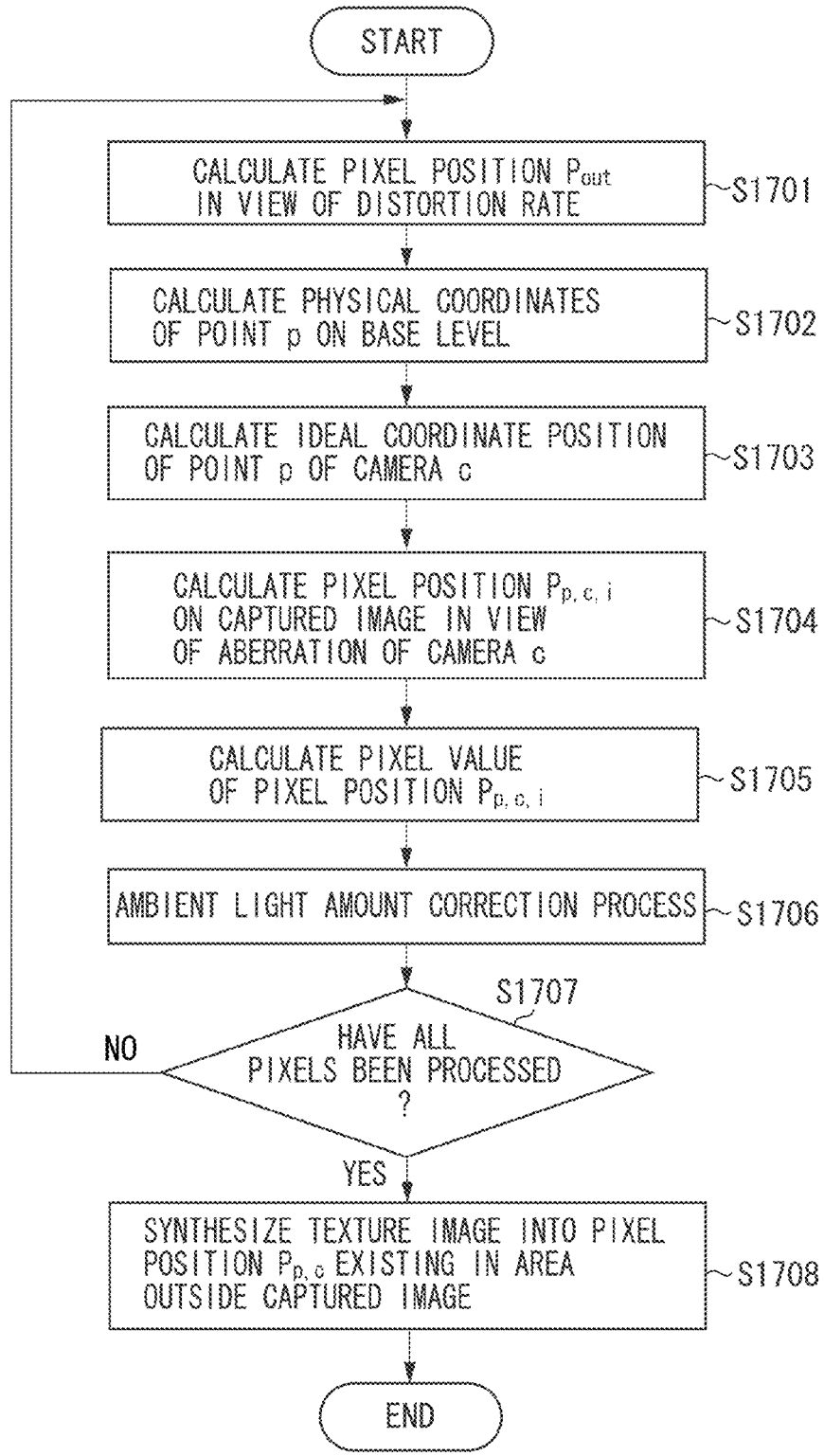
FIG. 17 is a flowchart of the virtual viewpoint video generation process.

FIG. 17 is a flowchart of the virtual viewpoint video generation process. Hereinafter, the virtual viewpoint video generation process will be described in detail. First, as illustrated in FIGS. 16A and 16B, the physical position of the virtual camera is represented as:

$\vec{X}_{out}$

The direction of the virtual camera is represented as:

$\vec{Z}_{d,out}$

The vector representing the upper direction on the screen of the virtual camera is represented as:

$\vec{Y}_{d,out}$

The vector representing the right-hand direction on the screen of the virtual camera is represented as:

$\vec{X}_{d,out}$

Since the above direction and vectors are merely direction vectors, the length of each of the vectors is set to be 1. In the coordinate system in which these vectors are represented, the above floor 102 is represented on the x-y plane and the height direction is represented by the z-axis. The horizontal half angle of view and the vertical half angle of view of the virtual camera are represented as θh, out and θv, out, respectively. The virtual viewpoint video generation process is executed for each pixel of the virtual viewpoint video.

To determine the pixel value of a target pixel, coordinates of the target pixel are represented as:

$\vec{p}_{out}$

First, to reflect distortion characteristics (distortion effect) set to the virtual camera on the virtual viewpoint video, in step S1701, the virtual viewpoint video generation thread executes inverse transformation of the distortion effect (distortion correction) on the coordinates of the target pixel and calculates coordinates of the pixel of the virtual viewpoint video after the distortion correction. The calculated coordinates are represented as:

$\vec{p}_{out}'$

While a specific mathematical expression for this inverse transformation depends on the set distortion effect, the following expression (1) may be used:

$$\vec{p}_{out}' = (1 + \alpha |\vec{p}_{out} - \vec{p}_{out,center}|^2)(\vec{p}_{out} - \vec{p}_{out,center}) + \vec{p}_{out,center} \quad (1)$$

In the above expression (1), $\vec{p}_{out,center}$ represents the position of the center pixel of an arbitrary viewpoint video and the parameter α controls strength of the distortion effect.

In step S1702, the virtual viewpoint video generation thread calculates the three-dimensional space position of a point $\vec{X}_p$, which corresponds to the pixel coordinates $\vec{p}_{out}'$ and is present on the above base level. Assuming that the height of the base level is represented as Zbase, the position $\vec{X}_p$ can be calculated by the following expressions (2) to (5):

$$\vec{X}_p = \vec{X}_{out} + r\vec{X}_{pixel} \quad (2)$$

$$\vec{X}_{pixel} = (\vec{X}_{d,out}, \vec{Y}_{d,out}, \vec{Z}_{d,out}) \begin{pmatrix} \vec{q}_{out,c} \\ 1/\tan\theta_{v,out} \end{pmatrix} \quad (3)$$

$$r = \frac{z_{base} - X_{p,z}}{X_{pixel,z}} \quad (5)$$

In the above expression (5), Xp, z and Xpixel, z are z components of $\vec{X}_p$ and $\vec{X}_{pixel}$.

In step S1703, the virtual viewpoint video generation thread calculates an ideal pixel position $\vec{p}_{p,c}'$ of a c-th camera (hereinafter, camera c), the ideal pixel position $\vec{p}_{p,c}'$ corresponding to the position $\vec{X}_p$. While actual objects have different heights, in the first exemplary embodiment, the object height is set to be the height of the base level to simplify the process.

The above ideal pixel position $\vec{p}_{p,c}'$ (ideal coordinates) is a pixel position when a video of the camera c does not include aberration such as distortion or chromatic aberration of magnification. The ideal pixel position $\vec{p}_{p,c}'$ can be calculated by the following expressions (6) to (9):

$$\vec{p}'_{p,c} = \vec{p}_{center,c} + \begin{pmatrix} (w/2)X_{p,c,x}/X_{p,c,z}/\tan\theta_{h,c} \\ -(h/2)X_{p,c,y}/X_{p,c,z}/\tan\theta_{v,c} \end{pmatrix} \quad (6)$$

$$\vec{X}_{p,c} = M\begin{pmatrix} \vec{X}_p \\ 1 \end{pmatrix} \quad (7)$$

$$M = [R, {}^tR\vec{X}_c] \quad (8)$$

$$^tR = [\vec{X}_{d,c}, \vec{Y}_{d,c}, \vec{Z}_{d,c}] \quad (9)$$

Xp,c,x, Xp,c,y, and Xp,c,z in the above expression (6) represent x, y, and z components of $\vec{X}_{p,c}$, and θh,c and θv,c represent the horizontal half angle of view and the vertical half angle of view of the camera c, respectively.

$\vec{X}_c$ in the expression (8) represents the position of the camera c. In addition, $\vec{X}_{d,c}$, $\vec{Y}_{d,c}$, and $\vec{Z}_{d,c}$ in the above expression (9) are direction vectors representing the upper direction and the right-hand direction in the video by the camera c and the orientation of the camera c, respectively. The length of each of these vectors is set to 1. A series of these operations is a collection of three transformation operations generally referred to as view transformation, projective transformation, and screen transformation.

In step S1704, the virtual viewpoint video generation thread converts the ideal pixel position $\vec{p}_{p,c}'$ into a real pixel position (real coordinates) $\vec{p}_{p,c,i}$ for each color, in view of the distortion and the chromatic aberration of magnification of the camera c. The real pixel position (real coordinates) $\vec{p}_{p,c,i}$ has a color index i. Basically, this operation can be represented by the following expression (10):

$$\vec{p}_{p,c,i} = \vec{f}_{c,i}(\vec{p}_{p,c}) \quad (10)$$

Since a specific expression for this conversion depends on the optical system of the camera c to be used, generally, this conversion cannot be represented by a simple function. Thus, the virtual viewpoint video generation thread refers to a table created based on measured values to execute this conversion.

In step S1705, the virtual viewpoint video generation thread calculates a pixel value Ip,c,i at the pixel position $\vec{p}_{p,c,i}$ of the camera c. Since the pixel position $\vec{p}_{p,c,i}$ has a fraction part, the virtual viewpoint video generation thread uses bicubic interpolation to acquire an interpolated pixel value from neighboring pixels.

In step S1706, while correcting the ambient light amount decrease of the camera c, the virtual viewpoint video generation thread calculates a factor Dp,c,i to add an ambient light amount decrease effect to the virtual viewpoint video. As represented by the following expression (11), this factor Dp,c,i is defined as the ratio of the amount Cp of the light amount decrease effect of the virtual viewpoint video (correction amount based on the ambient light amount decrease characteristics of the virtual camera) to the correction amount Cp,c,i of the ambient light amount decrease of the camera c at the pixel position $\vec{p}_{p,c,i}$ (correction amount based on the ambient light amount decrease characteristics of the camera c).

$$D_{p,c,i} = C_p/C_{p,c,i} \quad (11)$$

As with the correction of distortion, generally, the correction amount Cp,c,i of the ambient light amount decrease of the camera c cannot be represented by a simple function. Thus, the virtual viewpoint video generation thread executes the correction by referring to a correction table created based on measured values. The correction amount Cp,c,i can basically be represented by the following expression (12):

$$C_{p,c,i} = g_i(\vec{p}_{p,c,i}, I_{c,i}(\vec{p}_{p,c,i})) \quad (12)$$

As represented by the above expression, the virtual viewpoint video generation thread executes the correction in view of pixel value dependency of the ambient light amount decrease. For example, the ambient light amount decrease effect added to the virtual viewpoint video can be represented by the following expression (13):

$$C_p = (1-\beta|\vec{p}_{out} - \vec{p}_{out,center}|^4) \quad (13)$$

Next, the virtual viewpoint video generation thread calculates a pixel value Iout,i of the virtual viewpoint video based on expression (14). Parameter β controls strength of the ambient light amount decrease.

$$I_{out,i} = D_{p,c,i} \cdot I_{p,c,i} \quad (14)$$

Based on steps S1701 to S1706, the virtual viewpoint video generation thread determines the pixel value Iout,i with color i at the pixel position $\vec{p}_{out}$ of the virtual viewpoint video. In step S1707, the virtual viewpoint video generation thread determines whether all the pixels of the virtual viewpoint video have been processed. If not (NO in step S1707), the virtual viewpoint video generation thread repeats steps S1701 to S1706.

When the cover ratio, which will be described later, is not 100%, the pixel position calculated in step S1704 may have coordinates outside the captured image area. Thus, in step S1708, if a calculated pixel position is outside the captured image area, the virtual viewpoint video generation thread displays a predetermined image at the pixel position. In the first exemplary embodiment, the virtual viewpoint video generation thread executes parsing transformation on a prepared image (texture image) of the floor 102 based on the virtual viewpoint, to synthesize the image. Namely, when the pixel value refers to the outside of the captured image, the pixel value is synthesized with the pixel value of a parsing-transformed texture image. In this way, the virtual viewpoint video generation thread can generate a natural output image.

Thus, based on the above operations, the virtual viewpoint video generation thread can generate a virtual viewpoint video. In the first exemplary embodiment, to generate a natural virtual viewpoint image as if captured by a camera, the virtual viewpoint video generation thread reflects both the distortion characteristics and ambient light amount decrease characteristics set to the virtual camera on the virtual viewpoint video. However, the user may determine whether to reflect the distortion characteristics and the ambient light amount decrease characteristics set to the virtual camera on the virtual viewpoint video.

Figure 18A:
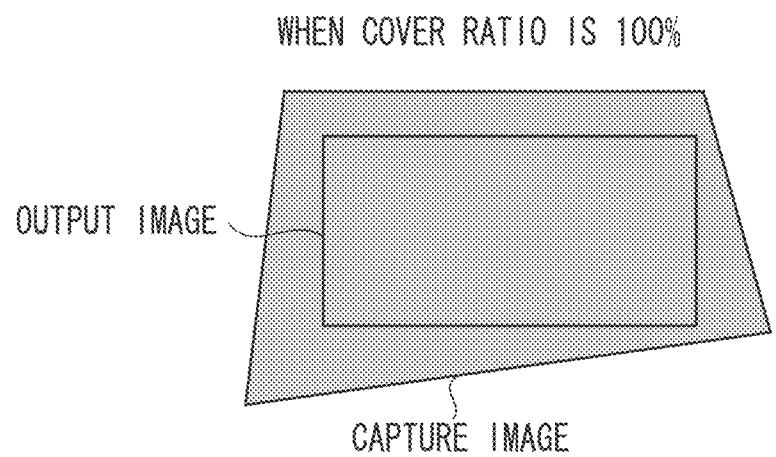
FIGS. 18A and 18B illustrate cover ratios.
Figure 18B:
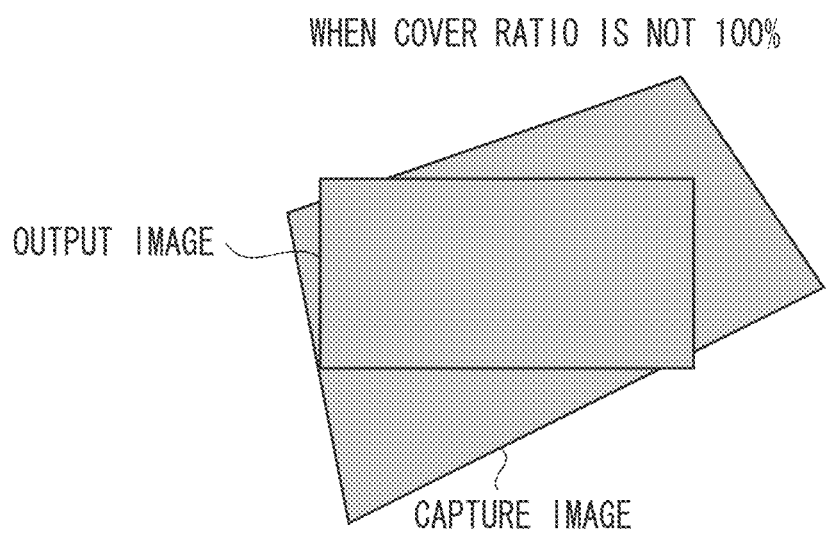

The management server PC 201 executes the camera selection process based on the cover ratio of each of the imaging cameras 101 that are functioning properly. FIGS. 18A and 18B illustrate cover ratios. The cover ratio is the ratio of an output image acquired by the virtual viewpoint video generation process to an image captured by a camera. The cover ratio is calculated based on the height of the base level in a target frame. In FIG. 18A, all the pixels of an output image are acquired from pixels of the captured image. Thus, the cover ratio is 100%. On the other hand, in FIG. 18B, part of an output image refers to an area outside of a captured area. Thus, the cover ratio is less than 100%.

Figure 19:
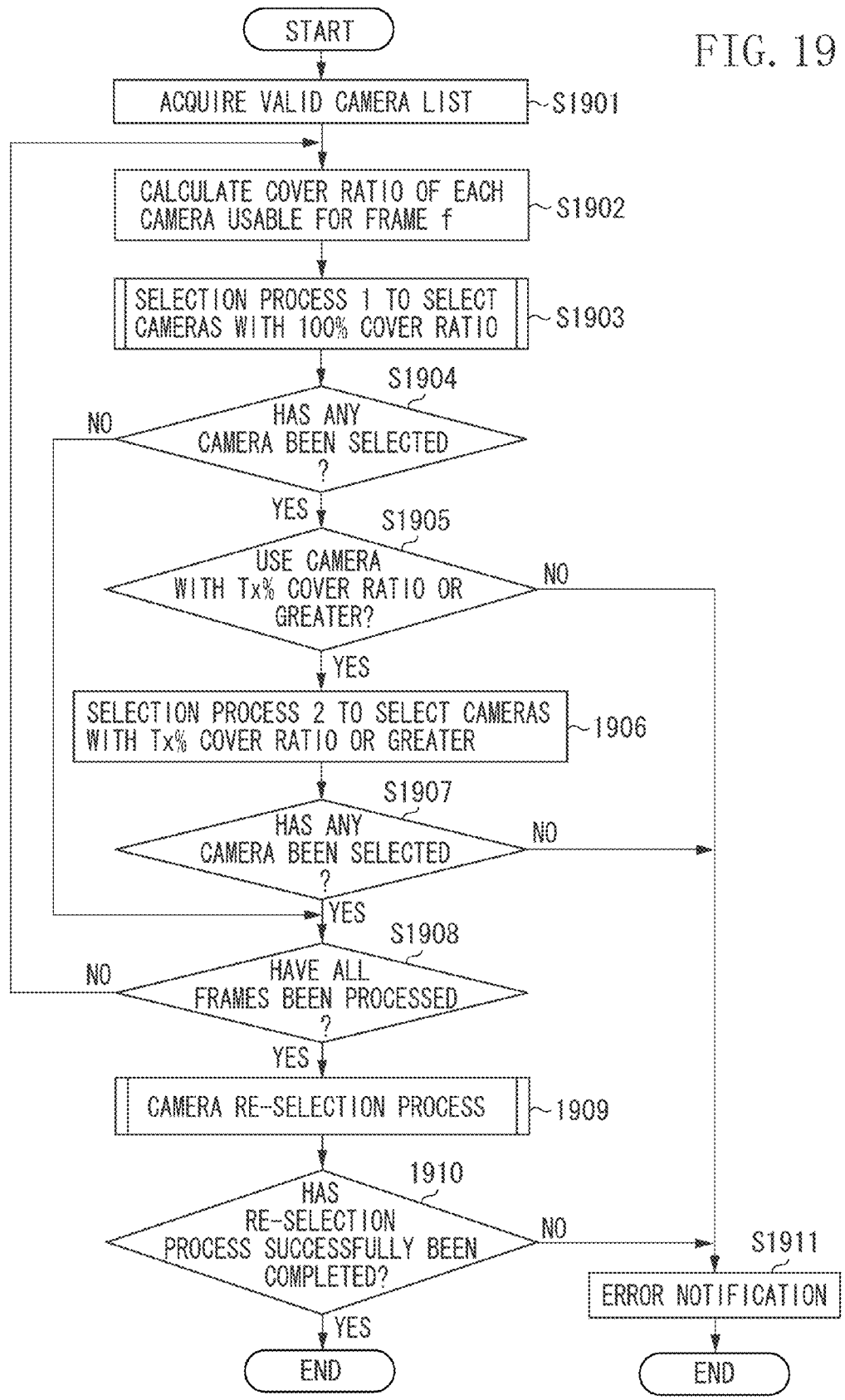
FIG. 19 is a flow chart of a camera selection process.

FIG. 19 is a flow chart of the camera selection process. First, in step S1901, the management server PC 201 acquires a valid camera list, which is a list of usable imaging cameras 101 that function properly in combination with corresponding capture PCs 202. The management server PC 201 can acquire the valid camera list during the validity determination process of FIG. 14 executed on the PCs 202 to 204 and the imaging cameras 101. Next, in step S1902, based on the virtual viewpoint information about each frame between the display start time and the display end time as described in the scenario of FIG. 6A, the management server PC 201 calculates the cover ratio of each of the imaging cameras 101 registered in the valid camera list. In step S1903, the management server PC 201 executes selection process 1 to select the imaging cameras 101 with a 100% cover ratio. In step S1904, the management server PC 201 determines whether any imaging cameras 101 have been selected by selection process 1. If no cameras are selected by selection process 1, in steps S1905 and S1906, the management server PC 201 executes selection process 2 based on a selection process mode setting. The selection process mode setting specifies whether to select any imaging cameras 101 with a cover ratio less than 100%. If such imaging cameras 101 can be selected (YES in step S1905), a threshold Tx (%) is specified. Selection processes 1 and 2 will be described in detail later. If no imaging cameras 101 are set by selection process 2 (NO in step S1907), in step S1911, the management server PC 201 transmits an error notification and ends the selection process.

In step S1908, the management server PC 201 determines whether an imaging camera 101 has been selected for each of the frames. If so (YES in step S1908), in step S1909, the management server PC 201 executes a camera re-selection process based on a correspondence relation between each frame and the imaging camera 101 selected therefor. For example, if transmission of video data of a single frame is not completed within 1/30 second, more specifically, if a transmission process from a certain capture PC 202 continues over a long time, real-time display cannot be executed. In addition, if the selected imaging camera 101 is switched frequently, image quality is also changed between frames. As a result, the displayed video is flickered. Thus, it is necessary to reduce the frequency of camera switching as much as possible to prevent a certain camera from being requested continuously over a long time. The re-selection process will be described in detail later. In step S1911, the management server PC 201 determines whether the re-selection process has successfully been completed. If an error is caused (NO in step S1910), the management server PC 201 transmits an error notification and ends the camera selection process. If the management server PC 201 transmits an error notification in the camera selection process in step S1911, the management server PC 201 determines that appropriate image quality cannot be obtained based on the normal display. Thus, in step S1411, the management server PC 204 automatically switches to the backup display.

Figure 20:
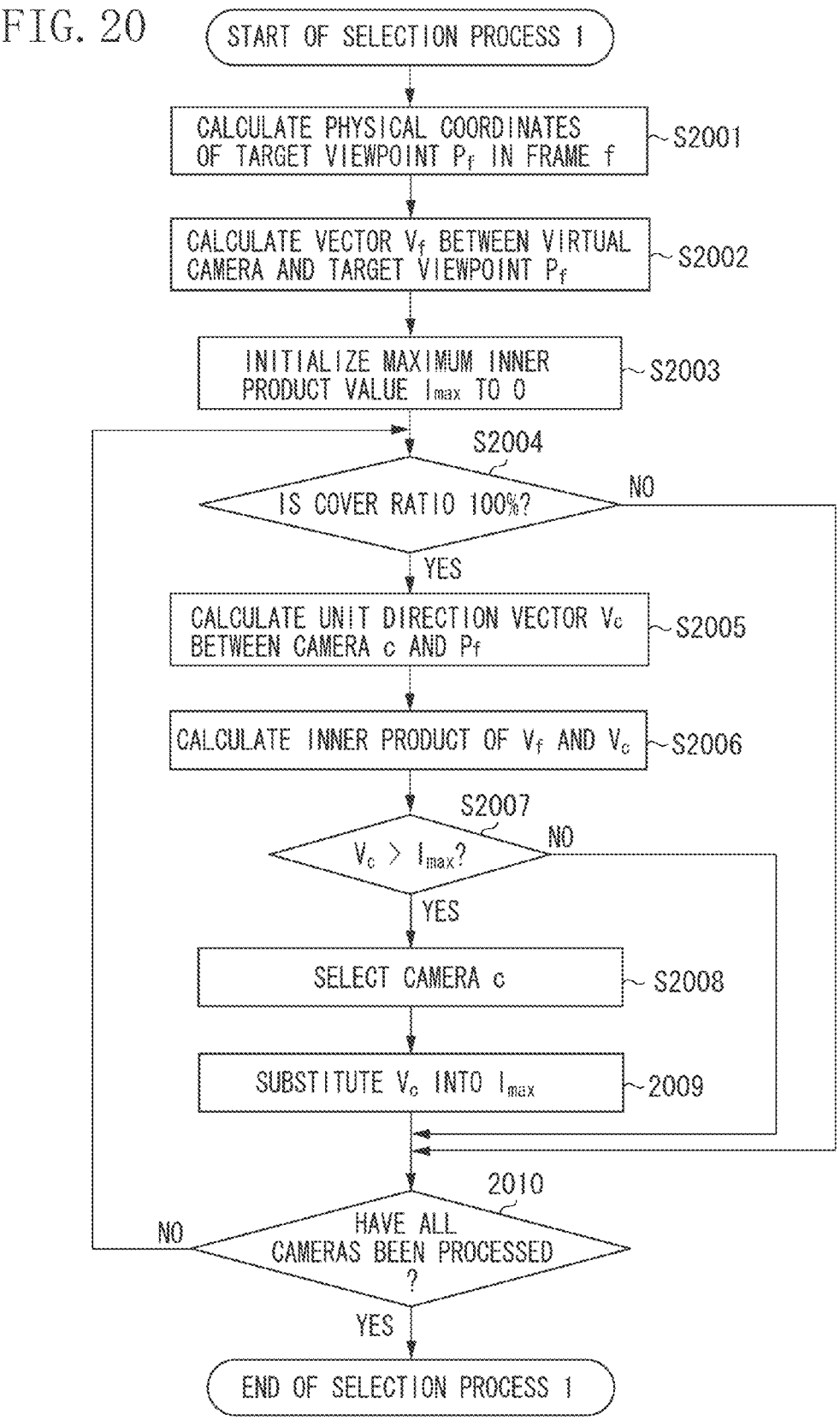
FIG. 20 is a flow chart of camera selection process 1.

FIG. 20 is a flow chart of selection process 1 of FIG. 19. First, in step S2001, the management server PC 201 calculates physical coordinates of a target viewpoint Pf in a target frame f. Next, in step S2002, the management server PC 201 calculates a vector Vf between the virtual viewpoint of the virtual camera and the target viewpoint Pf in the target frame f described in the scenario of FIG. 6A. In step S2003, the management server PC 201 initializes a maximum inner product value Imax to 0.

Next, in step S2004, the management server PC 201 detects imaging cameras 101 with a 100% cover ratio from among the imaging cameras 101 registered in the valid camera list. The management server PC 201 executes the following process on the imaging cameras 101 with a 100% cover ratio. First, in step S2005, the management server PC 201 calculates a unit direction vector Vc from the camera c to the target viewpoint Pf. In step S2006, the management server PC 201 calculates an inner product of the vectors Vc and Vf. In steps S2007 to S2009, the management server PC 201 selects a camera c with a maximum inner product. Namely, the management server PC 201 selects a camera so that the position and orientation of the virtual viewpoint in the target frame f are close to the position and orientation of a viewpoint.

Thus, in selection process 1, among the imaging cameras 101 with a certain cover ratio or greater (100% in the exemplary embodiment), the management server PC 201 selects an appropriate imaging camera 101 based on the position relationship between virtual viewpoint information about a frame and viewpoint information about a plurality of imaging cameras 101.

Figure 21:
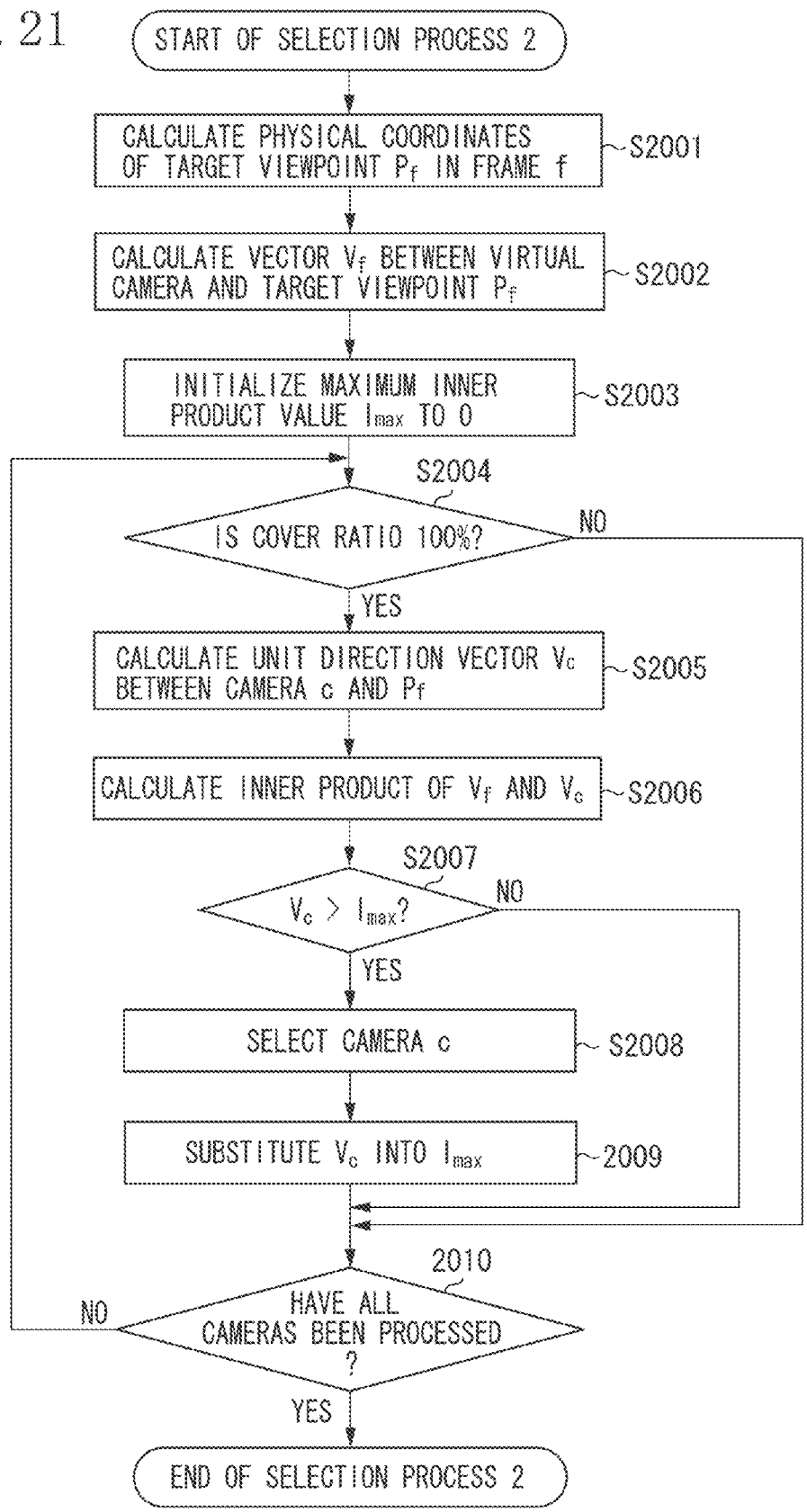
FIG. 21 is a flow chart of camera selection process 2.

FIG. 21 is a flow chart of selection process 2 of FIG. 19. In FIG. 21, operations identical to those of the flow chart of FIG. 20 are denoted by identical numbers, and repetitive description will be omitted. The management server PC 201 executes selection process 2 to detect the imaging cameras 101 with a Tx (%) cover ratio or greater and to select an imaging camera 101 positioned closest to the virtual camera viewpoint from among the detected imaging cameras 101.

Figure 22A:
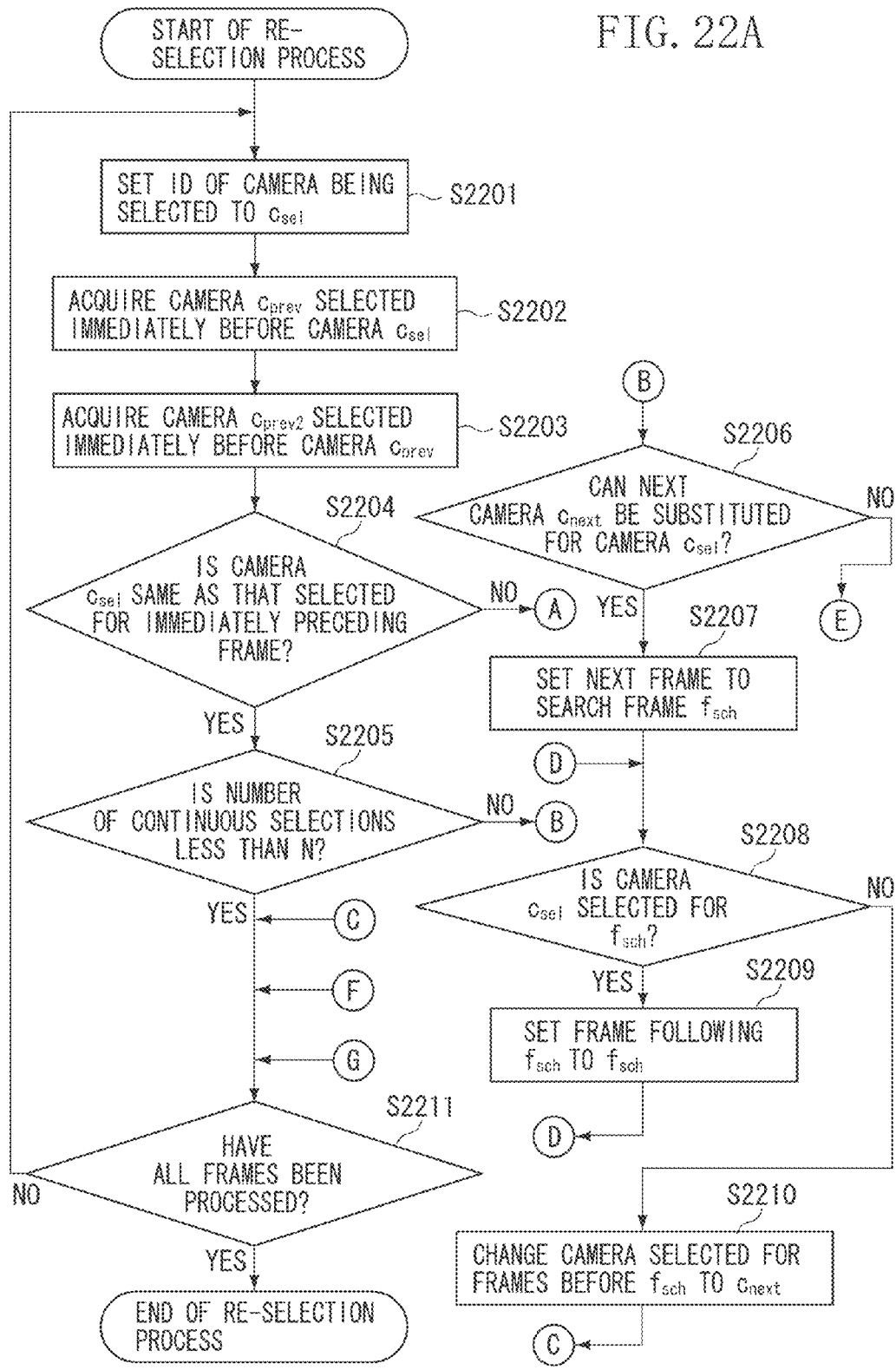
FIG. 22 is a flow chart of a camera re-selection process.
Figure 22B:
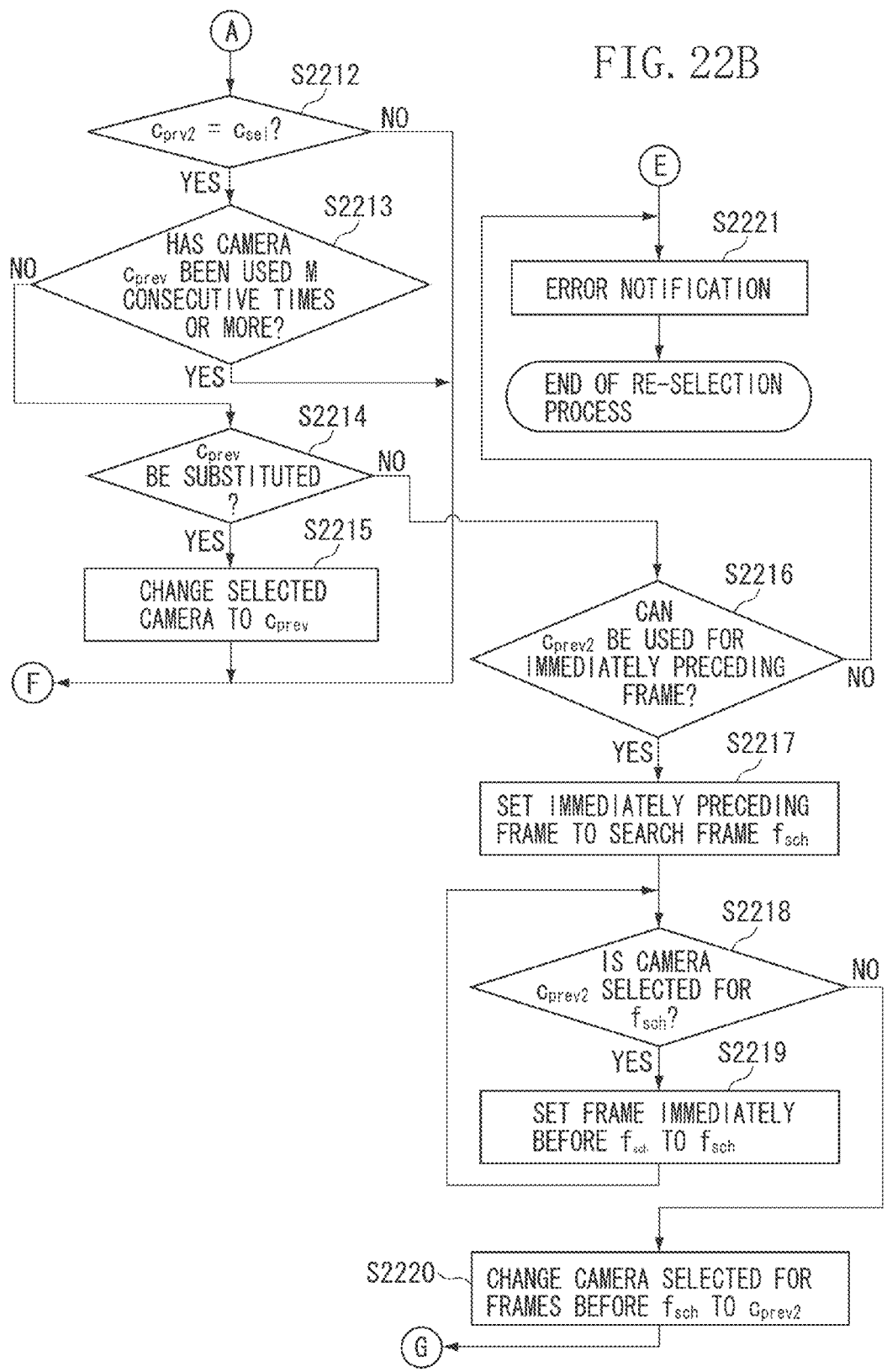

FIG. 22 is a flow chart of the re-selection process (step S1909) of FIG. 19. In the display system according to the first exemplary embodiment, the imaging cameras 101 are arranged along the moving route of the virtual viewpoint. Namely, the display system sequentially switches the imaging cameras 101 to be used to generate a virtual viewpoint video.

First, in step S2201, the management server PC 201 sets an imaging camera 101 selected for a target frame to c_sel. Next, in step S2202, the management server PC 201 acquires a camera c_prev selected immediately before the camera c_sel. The camera c_prev does not simply refer to a camera selected for the immediately preceding frame but to a camera selected for a frame previous to the target frame and selected immediately before the camera c_sel that is currently being selected. Likewise, in step S2203, the management server PC 201 acquires a camera c_prev2 selected immediately before the camera c_prev. In step S2204, the management server PC 201 checks whether the camera c_sel selected for the target frame is the same camera as that selected for the immediately preceding frame. The management server PC 201 executes different operations depending on the result of step S2204.

(a) If the same camera is selected for the immediately preceding frame and the target frame (YES in step S2204), the management server PC 201 executes a camera selection process in view of the number of continuous selections. In the first exemplary embodiment, the upper limit of the number of continuous selections is set to N. If the number of continuous selections is less than N (YES in step S2205), the management server PC 201 uses this selected camera c_sel. If not (NO in step S2205), in step S2206, the management server PC 201 checks whether a camera c_next, which is a camera selected next based on the scenario, can be substituted for the selected camera c_sel based on the cover ratio. If the camera c_next can be substituted (YES in step S2206), in steps S2207 to S2210, for frames for which the camera c_sel is continuously selected after the currently processed frame, the management server PC 201 changes the selected camera c_sel to the camera c_next. If not (NO in step S2206), in step S2221, the management server PC 201 transmits an error notification and ends the re-selection process.

(b) If the selected camera c_sel is different from that selected for the immediately preceding frame (NO in step S2204), the management server PC 201 executes a camera selection process in view of the frequency of camera switching. First, in step S2212, the management server PC 201 determines whether the selected camera c_sel is the same as the camera c_prev2 selected immediately before the camera c_prev. If the cameras c_sel and c_prev2 are the same (YES in step S2212), the selected camera may be alternately switched between the cameras c_sel and c_prev. Thus, the management server PC 201 executes a process to prevent such operation.

First, in step S2213, the management server PC 201 checks whether the camera c_prev has been used M consecutive times or more before the immediately preceding frame. If not (NO in step S2213), the frequency of camera switching may be high. Thus, in step S2214, the management server PC 201 checks whether the camera c_prev can substitute the camera c_sel. If the camera c_prev can be substituted (YES in step S2214), in step S2215, the management server PC 201 changes the selected camera to the camera c_prev. If not (NO in step S2214), in step S2216, the management server PC 201 checks whether the camera c_prev2 can be used for the immediately preceding frame. If so (YES in step S2216), in steps S2217 to S2220, for all the frames before the immediately preceding frame for which the camera c_prev is continuously selected, the management server PC 201 changes the selected camera to c_prev2. In step S2211, the management server PC 201 determines whether all the frames have been processed.

If the camera c_prev2 cannot be used for the immediately preceding frame (NO in step S2216), in step S2221, the management server PC 201 transmits an error notification and ends the re-selection process. In steps S1910 and S1911 of the re-selection process, if the management server PC 201 transmits an error notification, the management server PC 201 automatically switches to the backup display.

In the camera re-selection process according to the first exemplary embodiment, if the management server PC 201 executes the above process (b), the management server PC 201 may determine that the number of continuous selections is N times or more. In this case, needless to say, the management server PC 201 can prevent the number of continuous selections from reaching N times or more, by checking the number of continuous selections after this process (b) and executing the process (a).

Based on the camera selection process described above, even if failure is caused in any one of the imaging cameras 101 or the capture PCs 202, a video can be displayed properly. Particularly, when the management server PC 201 executes the camera selection process in view of image quality and determines that appropriate image quality cannot be obtained, since the management server PC 201 automatically switches to the backup display, a system capable of displaying a video over a long period of time can be established.

In the virtual viewpoint video generation process according to the first exemplary embodiment, the object height is set to be the height of the base level. Thus, if the imaging cameras 101 are switched, the position of the object may change discontinuously between frames. However, based on the re-selection process, the camera for the target frame can be re-selected so that the frequency of camera switching is decreased. Therefore, a smooth free viewpoint video can be generated.

Figure 23:
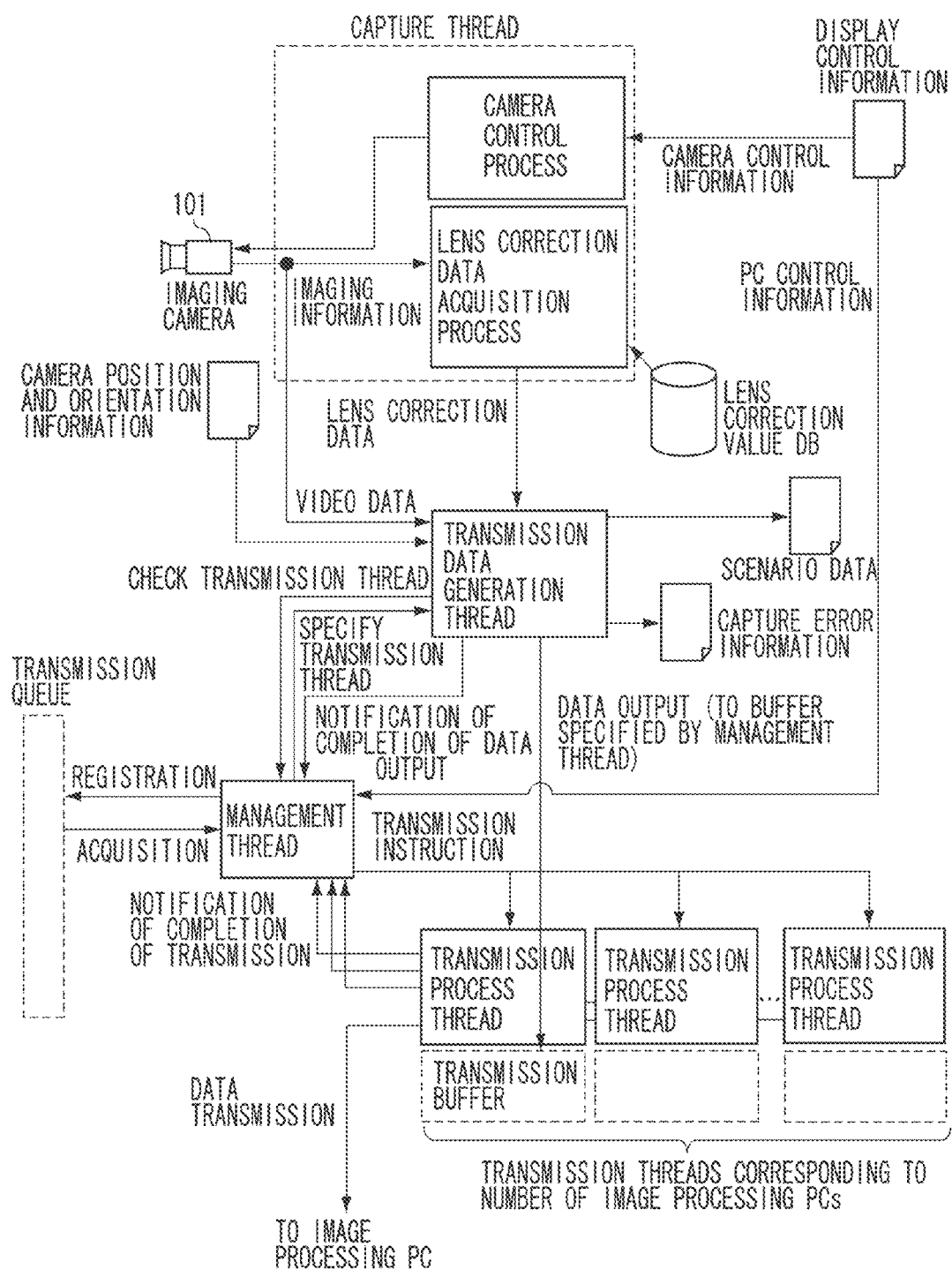
FIG. 23 illustrates overall processes of a capture PC according to a second exemplary embodiment.

In the first exemplary embodiment, a capture PC 202 transmits all the image data captured by a corresponding imaging camera 101. However, if an angle of view specified by the scenario is narrower than that of the imaging camera 101, the capture PC 202 does not need to transmit all the image data. Thus, in the second exemplary embodiment, before transmitting image data to the image processing PC 203, the capture PC 202 determines necessary data of the captured image and transmits only the essential data. FIG. 23 illustrates overall processes of a capture PC 202 according to the second exemplary embodiment. As described in the virtual viewpoint video generation process according to the first exemplary embodiment, the capture PC 202 uses scenario data to determine a necessary area of the captured image data (transmission area determination process).

Figure 24:
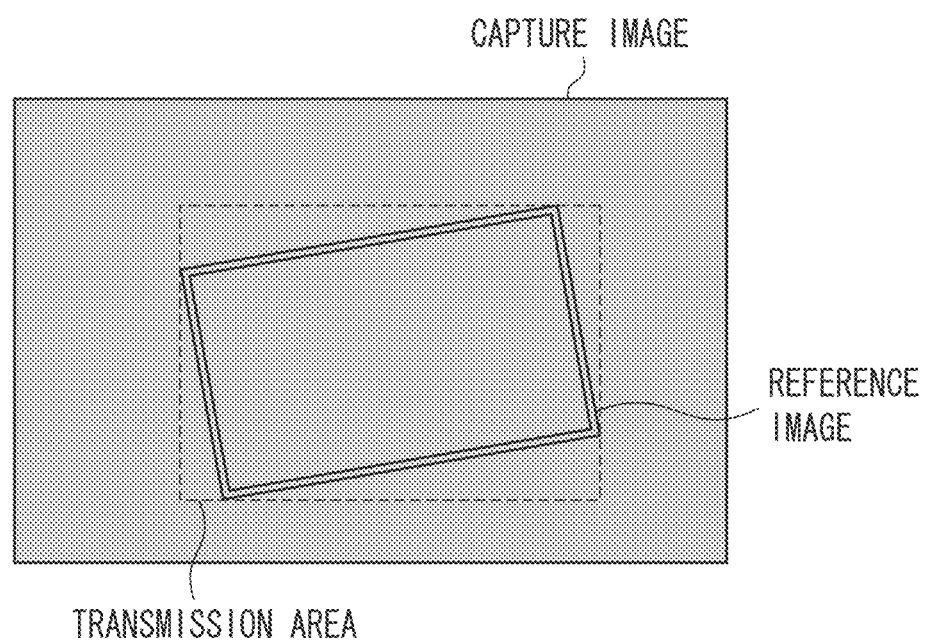
FIG. 24 illustrates a transmission area according to the second exemplary embodiment.

The capture PC 202 executes the transmission area determination process as follows. As with the virtual viewpoint video generation process, the capture PC 202 calculates the reference pixel position of the captured image. However, the capture PC 202 does not process all the pixels of an output image but only the pixels near four sides of an output image. As illustrated in FIG. 24, among the reference pixels obtained as a result, the capture PC 202 determines an area defined by maximum and minimum coordinate values in the horizontal and vertical directions to be a transmission area.

Figure 25:
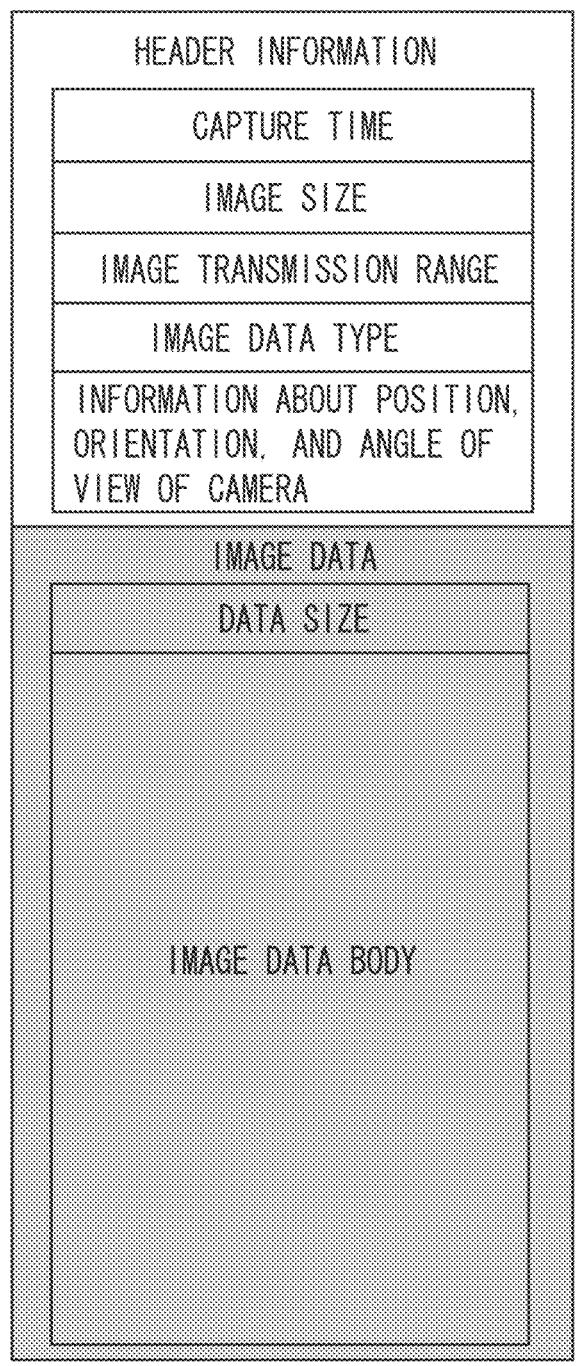
FIG. 25 illustrates a format of data transmitted from a capture PC to an image processing PC according to the second exemplary embodiment.

As described in the first exemplary embodiment, in the virtual viewpoint video generation process, the center position of a captured image (optical axis center position) is necessary. Thus, the transmitted image data needs to hold data that represents where the transmitted image data is included in the captured image (image transmission area). FIG. 25 illustrates a data format according to the second exemplary embodiment. In the virtual viewpoint video generation process according to the second exemplary embodiment, the pixel position is calculated in view of this image transmission area. However, the process is similar to that according to the first exemplary embodiment, excepting that pixel positions are shifted by the position of upper-left pixel in the image transmission area. Thus, repetitive description will be omitted.

As described above, by using the image reproducing apparatus according to the second exemplary embodiment, an appropriate data transmission amount can be set. As a result, network load is reduced, and the buffering time of each of the PCs can be shortened. Thus, since a time lag between image capture and image display can be reduced, user experience quality can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-095095 filed Apr. 16, 2010, which is hereby incorporated by reference herein in its entirety.

What is claimed is:

1. An image processing apparatus generating a virtual viewpoint image from a captured image acquired by an imaging unit having distortion characteristics and vignetting characteristics, based on distortion characteristics and vignetting characteristics of a virtual camera, the image processing apparatus comprising:
   a first calculation unit configured to execute a first distortion correction on coordinates of a target pixel in the virtual viewpoint image based on the distortion characteristics of the virtual camera and to calculate coordinates in the virtual viewpoint image after the first distortion correction;
   a second calculation unit configured to calculate ideal coordinates that are not distorted and correspond to a space position captured at the target pixel in the captured image from the coordinates of the target pixel in the virtual viewpoint image after the distortion correction;
   a third calculation unit configured to execute a second distortion correction on coordinates of the captured image and to calculate real coordinates in the captured image from the ideal coordinates based on the distortion characteristics of the imaging unit;
   a fourth calculation unit configured to calculate a pixel value of the target pixel based on the real coordinates and the captured image data; and
   a correction unit configured to correct the pixel value based on the vignetting characteristics of the imaging unit and the vignetting characteristics of the virtual camera.

2. The image processing apparatus according to claim 1, wherein the second calculation unit comprises:
   a fifth calculation unit configured to calculate a space position of a captured point on a base level from the coordinates in the virtual viewpoint image after the first distortion correction; and
   a sixth calculation unit configured to use position information about the imaging unit and to calculate the ideal coordinates in the captured image from the space position on the base level.

3. The image processing apparatus according to claim 1, wherein, if the real coordinates represent an area outside the captured image, a previously stored texture image is synthesized in an area of the virtual viewpoint image.

4. The image processing apparatus according to claim 1, wherein the third calculation unit calculates the real coordinates in the captured image from ideal coordinates of the captured image, based on the distortion characteristics of the imaging unit and an aberration of the imaging unit.

5. A non-transitory computer-readable storage medium storing a program for causing a computer to implement the image processing apparatus according to claim 1.

6. An image processing method for generating a virtual viewpoint image from a captured image acquired by an imaging unit having distortion characteristics and vignetting characteristics, based on distortion characteristics and vignetting characteristics of a virtual camera, the image processing method comprising:
   executing a first distortion correction on coordinates of a target pixel in the virtual viewpoint image based on the distortion characteristics of the virtual camera and calculating coordinates in the virtual viewpoint image after the distortion correction;
   calculating ideal coordinates that are not distorted and correspond to a space position captured at the target pixel in the captured image from the coordinates of the target pixel in the virtual viewpoint image after the distortion correction;
   executing a second distortion correction on coordinates of the captured image and calculating real coordinates in the captured image from the ideal coordinates based on the distortion characteristics of the imaging unit;
   calculating a pixel value of the target pixel based on the real coordinates and the captured image data; and
   correcting the pixel value based on the vignetting characteristics of the imaging unit and the vignetting characteristics of the virtual camera.

\* \* \* \* \*